United States Patent
Ezoe et al.

(10) Patent No.: US 9,380,196 B2
(45) Date of Patent: Jun. 28, 2016

(54) CONTROL DEVICE FOR CONTROLLING A CAMERA USING A PANORAMA IMAGE HAVING ONE OR MORE PRESET REGIONS, A CAMERA SYSTEM HAVING SUCH CONTROL DEVICE, AND A PROGRAM PERTAINING THERETO

(75) Inventors: Toshihiro Ezoe, Kanagawa (JP); Kazunori Sakaki, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/932,945

(22) Filed: Mar. 10, 2011

(65) Prior Publication Data

US 2011/0234832 A1 Sep. 29, 2011

(30) Foreign Application Priority Data

Mar. 26, 2010 (JP) ................. P2010-073232

(51) Int. Cl.
*H04N 5/222* (2006.01)
*H04N 5/232* (2006.01)
*H04N 5/247* (2006.01)
*H04N 5/262* (2006.01)
*H04N 7/18* (2006.01)

(52) U.S. Cl.
CPC ........... *H04N 5/232* (2013.01); *H04N 5/23206* (2013.01); *H04N 5/23216* (2013.01); *H04N 5/23238* (2013.01); *H04N 5/247* (2013.01); *H04N 5/2628* (2013.01); *H04N 7/181* (2013.01)

(58) Field of Classification Search
USPC ................................ 348/36, 222.1
See application file for complete search history.

(56) References Cited

U.S. PATENT DOCUMENTS

| 5,850,352 | A  | * | 12/1998 | Moezzi et al. ............... 345/419 |
| 6,720,987 | B2 |   | 4/2004  | Koyanagi et al. |
| 6,970,181 | B1 | * | 11/2005 | Fadel .......................... 348/14.01 |
| 7,720,359 | B2 |   | 5/2010  | Koyanagi et al. |
| 2002/0018136 | A1 | * | 2/2002 | Kaji et al. ................. 348/333.02 |
| 2004/0257436 | A1 | * | 12/2004 | Koyanagi et al. ............... 348/36 |
| 2009/0040238 | A1 | * | 2/2009 | Ito et al. ....................... 345/660 |
| 2009/0278914 | A1 |   | 11/2009 | Koyanagi et al. |
| 2010/0073487 | A1 | * | 3/2010 | Sogoh et al. ............... 348/207.1 |

FOREIGN PATENT DOCUMENTS

JP 9327008 12/1997
(Continued)

OTHER PUBLICATIONS

Office Action from Japanese Application No. 2010-073232, dated Nov. 12, 2013.
(Continued)

*Primary Examiner* — Roberto Velez
*Assistant Examiner* — Stephen Coleman
(74) *Attorney, Agent, or Firm* — Lerner, David, Littenberg, Krumholz & Mentlik, LLP

(57) ABSTRACT

A control device of present invention includes a display control portion that performs control such that a whole image display region, in which a whole image captured by a camera is displayed, and an enlarged image display region, in which a region corresponding to a position specified on the whole image is enlarged and an enlarged image is displayed, are displayed, and a control portion that performs control such that the region corresponding to the position specified on the whole image is changed. The region includes at least one preset region, and the display control portion displays, on the whole image, a section that corresponds to the preset region.

16 Claims, 28 Drawing Sheets

(56) References Cited

FOREIGN PATENT DOCUMENTS

| JP | 2005-354748 A | 12/2005 |
| JP | 2006191408 A | 7/2006 |
| JP | 2008-022260 A | 1/2008 |
| JP | 2008211413 A | 9/2008 |

OTHER PUBLICATIONS

Office Action from Chinese Application No. 2011-10067427.X dated Sep. 3, 2014.

Office Action from Japanese Application No. 2010-073232, dated Jun. 24, 2014.

* cited by examiner

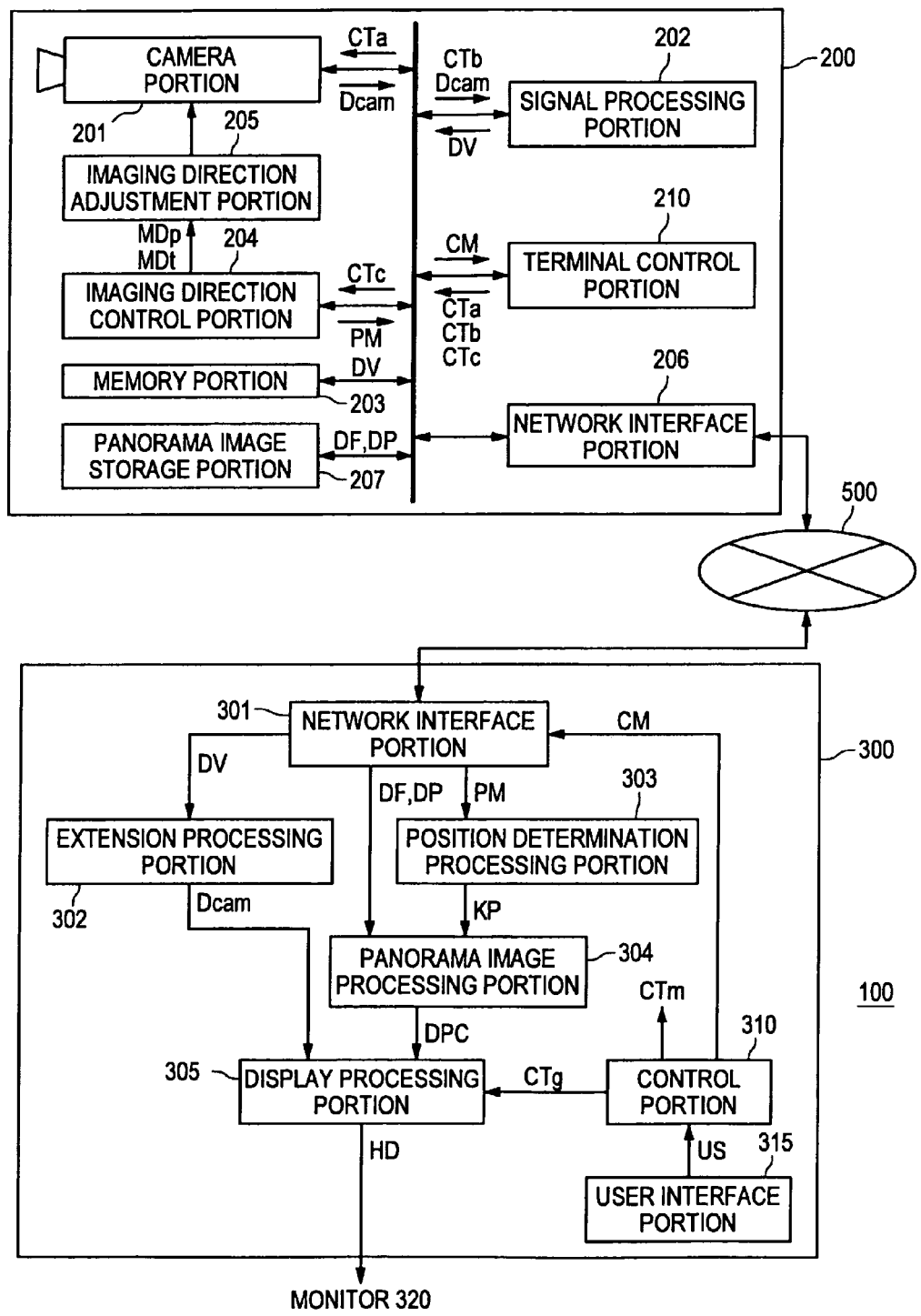

GENERAL PAN TILT CAMERA
PAN 360° CONTINUOUS ROTATION

TILT 90°

CAMERA OF PRESENT EMBODIMENT
PAN 360° CONTINUOUS ROTATION

TILT 220°

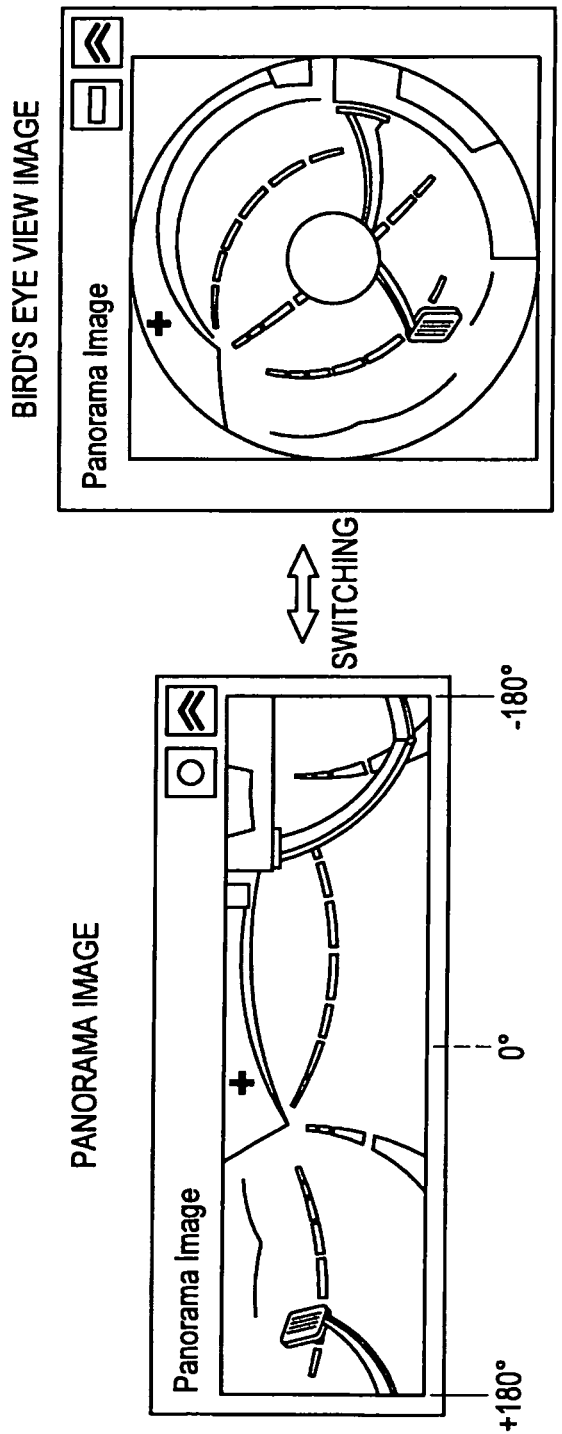
FIG.4 SWITCHING BETWEEN TWO MODES

FIG.9
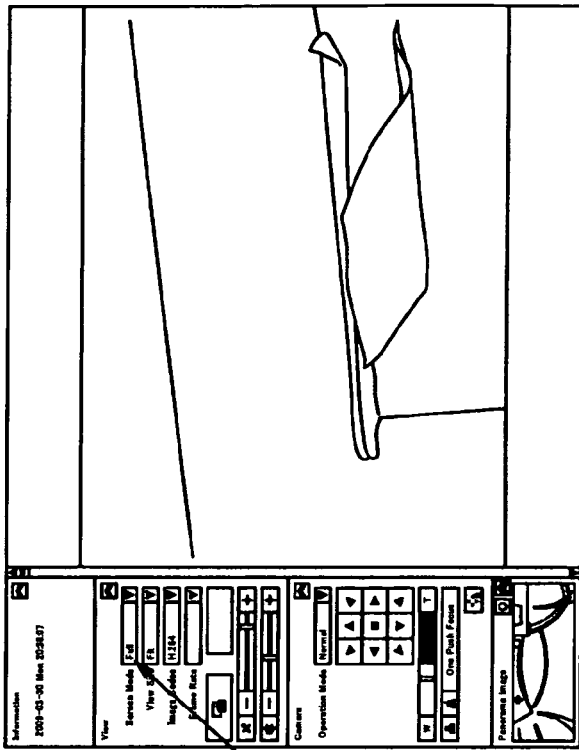
WHOLE IMAGE IS DISPLAYED WHEN SCREEN MODE IS CHANGED TO FULL SCREEN.
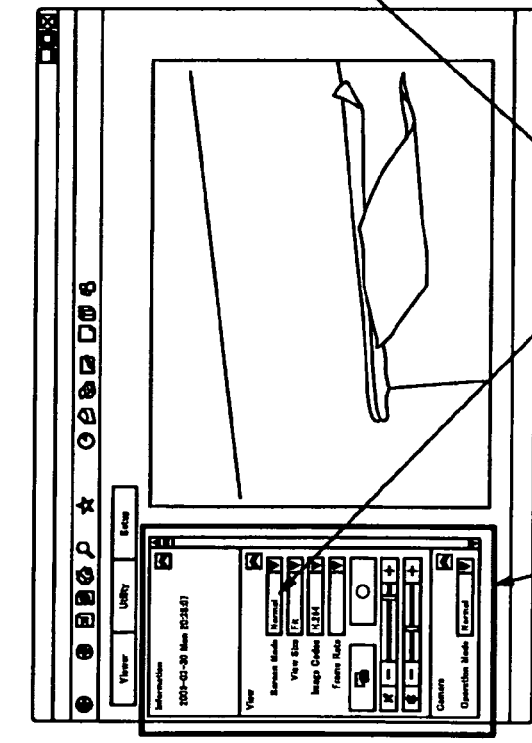
OPERATION PANEL IS ARRANGED ON LEFT SIDE.

CONTROL DEVICE FOR CONTROLLING A
CAMERA USING A PANORAMA IMAGE
HAVING ONE OR MORE PRESET REGIONS,
A CAMERA SYSTEM HAVING SUCH
CONTROL DEVICE, AND A PROGRAM
PERTAINING THERETO

CROSS-REFERENCE TO RELATED
APPLICATION

The present application claims priority from Japanese Patent Application No. JP 2010-073232 filed in the Japanese Patent Office on Mar. 26, 2010, the entire content of which is incorporated herein by reference.

BACKGROUND OF THE INVENTION

1. Field of the Invention

The present invention relates to a control device, a camera system and a program.

2. Description of the Related Art

A camera control system is known in which a range that can be captured by a camera is displayed as a whole image and an imaging direction of the camera is controlled by an operation on the whole image. This camera control system is described, for example, in Japanese Patent Application Publication No. JP-A-2005-354748. Further, a camera control system is known in which sections corresponding to preset sections are displayed as thumbnails, and when a desired one of the thumbnails is selected, the imaging direction of the camera is controlled to the corresponding preset section (refer to Japanese Patent Application Publication No. JP-A-2008-22260, for example).

SUMMARY OF THE INVENTION

However, in either of the above-described camera control systems described in Japanese Patent Application Publication No. JP-A-2005-354748 and Japanese Patent Application Publication No. JP-A-2008-22260, it is not possible to easily ascertain, in the range (the whole image) that can be captured by the camera, which position corresponds to the preset section. In addition, in the technologies described in JP-A-2005-354748 and JP-A-2008-22260, a preset position cannot be determined on the whole image. Therefore, the imaging direction cannot be controlled toward the preset section by an operation on the whole image. As a result, it is not possible to intuitively control the imaging direction to a desired preset direction, and a lot of trial and error is required.

In light of the foregoing, it is desirable to provide a control device, a camera system and a program that are novel and improved and that allow intuitive control of an imaging direction to a preset region that is set in a whole image.

According to an embodiment of the present invention, there is provided a control device includes a display control portion that performs control such that a whole image display region, in which a whole image captured by a camera is displayed, and an enlarged image display region, in which a region corresponding to a position specified on the whole image is enlarged and an enlarged image is displayed, are displayed, and a control portion that performs control such that the region corresponding to the position specified on the whole image is changed. The region includes at least one preset region, and the display control portion displays, on the whole image, a section that corresponds to the preset region.

In this configuration, the control portion performs control such that the region corresponding to the position specified on the whole image is captured by the camera.

In this configuration, when the section that corresponds to the preset region is selected on the whole image, the control portion controls an imaging direction of the camera such that the selected preset region is captured.

In this configuration, the display control portion displays, on the whole image, the section that corresponds to the preset region, based on a size of an angle of view that is set based on the preset region.

In this configuration, when the preset region is not positioned in a center of the whole image, the display control portion corrects a size of a frame at an imaging magnification that is set based on the preset region, using as a reference a size of the frame when the preset region is positioned in the center of the whole image, and performs display.

In this configuration, the display control portion changes a position of the preset region in accordance with a drag operation performed by a user, and performs display.

In this configuration, when a plurality of the preset regions are specified on the whole image, the control portion controls an imaging direction of the camera such that the plurality of the preset regions are sequentially captured, and the display control portion controls image display such that the plurality of the preset regions are displayed as a list.

In this configuration, when the plurality of the preset regions are specified on the whole image, the control portion controls the imaging direction of the camera such that the plurality of the preset regions are sequentially captured, and the display control portion alternately displays the plurality of the preset regions.

According to another embodiment of the present invention, there is provided a camera system includes a camera that captures an image and a control device that controls the camera. The control device includes a display control portion that performs control such that a whole image display region, in which a whole image captured by the camera is displayed, and an enlarged image display region, in which a region corresponding to a position specified on the whole image is enlarged and an enlarged image is displayed, are displayed, and a control portion that performs control such that the region corresponding to the position specified on the whole image is changed. The region includes at least one preset region, and the display control portion displays, on the whole image, a section that corresponds to the preset region.

In this configuration, the control portion performs control such that the region corresponding to the position specified on the whole image is captured by the camera.

In this configuration, when the section that corresponds to the preset region is selected on the whole image, the control portion controls an imaging direction of the camera such that the selected preset region is captured.

In this configuration, the display control portion displays, on the whole image, the section that corresponds to the preset region, based on a size of an angle of view that is set based on the preset region.

In this configuration, when the preset region is not positioned in a center of the whole image, the display control portion corrects a size of a frame at an imaging magnification that is set based on the preset region, using as a reference a size of the frame when the preset region is positioned in the center of the whole image, and performs display.

In this configuration, the display control portion changes a position of the preset region in accordance with a drag operation performed by a user, and performs display.

In this configuration, when a plurality of the preset regions are specified on the whole image, the control portion controls an imaging direction of the camera such that the plurality of the preset regions are sequentially captured, and the display control portion controls image display such that the plurality of the preset regions are displayed as a list.

In this configuration, when the plurality of the preset regions are specified on the whole image, the control portion controls the imaging direction of the camera such that the plurality of the preset regions are sequentially captured, and the display control portion alternately displays the plurality of the preset regions.

According to another embodiment of the present invention, there is provided a program that comprises instructions that command a computer to function as a display control unit which performs control such that a whole image display region, in which a whole image captured by a camera is displayed, and an enlarged image display region, in which at least one preset region specified on the whole image is enlarged and an enlarged image is displayed, are displayed, and which displays, on the whole image, a section that corresponds to the preset region, and a control unit that performs control such that a region corresponding to a position specified on the whole image is changed.

According to the present invention described above, it is possible to provide the control device, the camera system and the program that allow intuitive control of the imaging direction to the preset region that is set in the whole image.

BRIEF DESCRIPTION OF THE DRAWINGS

FIG. 2 is a schematic diagram showing, in detail, configurations of a camera terminal device and a center server in the imaging system shown in FIG. 1;

FIG. 4 is a schematic diagram showing display states of a panorama image and a bird's eye view image;

FIG. 9 is a schematic diagram showing display screens of a monitor;

DETAILED DESCRIPTION OF THE EMBODIMENT(S)

Figure 1:
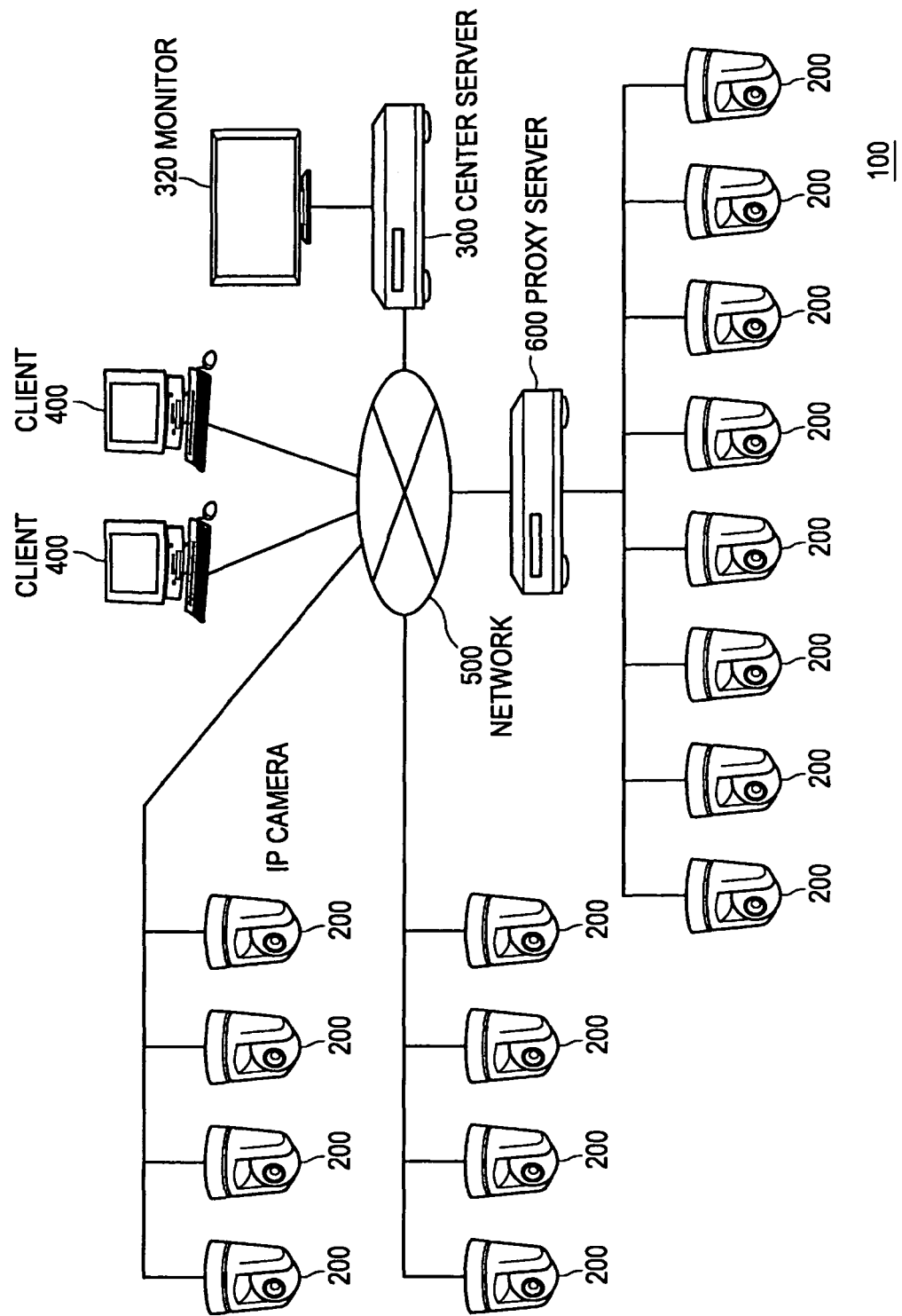
FIG. 1 is a schematic diagram showing an overall configuration of an imaging system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. First embodiment (example of imaging system including camera terminal devices and servers)
   (1) Configuration example of imaging system
   (2) Configuration example of camera terminal device and center server
   (3) Display operations of first panorama image and second panorama image
   (4) Processing to generate first panorama image
   (5) Graphical user interface (GUI)
   (6) Specifying of imaging direction on first panorama image
   (7) Control using preset position

1. First Embodiment

(1) Configuration Example of Imaging System

FIG. 1 is a schematic diagram showing an overall configuration of an imaging system 100 according to an embodiment of the present invention. The imaging system 100 includes camera terminal devices (IP cameras) 200, a center server 300 and clients 400. A plurality of the camera terminal devices 200, the center server 300 and the clients 400 are connected via a network 500. A proxy server 600 is connected to the network 500, and a plurality of the camera terminal devices 200 are connected to the proxy server 600. Further, a monitor 320 is connected to the center server 300. In the present embodiment, the camera terminal devices 200 are, for example, monitoring cameras that are placed indoors or outdoors. A region in which each of the camera terminal devices 200 is provided can be monitored by displaying, on the monitor 320 of the center server 300, an image acquired by each of the camera terminal devices 200. The clients 400 are connected, via the network 500, to the camera terminal devices 200, the center server 300 or the proxy server 600. The clients 400 may have a function of the center server 300 and a function of the monitor 320, which will be described later. Images captured by the camera terminal devices 200 are transmitted to the clients 400 via the network 500, and a first panorama image and a second panorama image are displayed on a display screen of each of the clients 400 together with a live image that will be described later. Note that, although the IP cameras are shown as an example of the camera terminal devices 200, the camera terminal devices 200 are not limited to the IP cameras and they may be analog cameras.

Panorama images (a full view image, a whole image) indicate a range that can be captured by each of the camera terminal devices 200. There are various shapes of panorama images, examples of which include a circular panorama image and a rectangular panorama image such as those shown in FIG. 4, and a loop-shaped panorama image as projected onto a cylindrical surface. Hereinafter, in the present embodiment, the circular panorama image and the rectangular panorama image are explained as examples of the first panorama image and the second panorama image, respectively.

(2) Configuration Example of Camera Terminal Device and Center Server

FIG. 2 is a schematic diagram showing, in detail, configurations of the camera terminal device 200 and the center server 300 in the imaging system shown in FIG. 1. Respective structural elements of the camera terminal device 200 or the center server 300 shown in FIG. 2 can be formed by hardware (circuits or the like), or by an arithmetic processing unit, such as a CPU, and software (a program) that causes the arithmetic processing unit to function. A camera portion 201 of the camera terminal device 200 includes an imaging optical system. The camera portion 201 performs an imaging operation based on an imaging control signal CTa that is supplied from a terminal control portion 210 to be described later, and generates a video signal Dcam. Further, the camera portion 201 supplies the generated video signal Dcam to a signal processing portion 202 via a bus 220. Note that a memory portion 203, an imaging direction control portion 204, a network interface portion 206, a panorama image storage portion 207 and the terminal control portion 210 are also connected to the bus 220.

The signal processing portion 202 performs compression processing of the video signal Dcam, and stores an obtained video coding signal DV in the memory portion 203. Further, the signal processing portion 202 uses the video signal Dcam, which is obtained by sequentially moving the imaging direction of the camera portion 201, to generate a video signal DF of the first panorama image (this signal is hereinafter also referred to as a first panorama image signal DF) and a video signal DP of the second panorama image (this signal is hereinafter also referred to as a second panorama image signal DP). Then, the signal processing portion 202 stores the generated first panorama image signal DF and second panorama image signal DP in the panorama image storage portion 207. Note that the compression processing of the video signal Dcam and the generation of the first panorama image signal DF and the second panorama image signal DP are performed based on a signal processing control signal CTb supplied from the terminal control portion 210 that will be described later.

In order to move the imaging direction of the camera portion 201 to a direction instructed by a direction control signal CTc supplied from the terminal control portion 210 that will be described later, the imaging direction control portion 204 calculates speed and acceleration when moving the imaging direction. Further, the imaging direction control portion 204 generates, based on a calculation result, a driving signal MDp to perform a pan operation and a driving signal MDt to perform a tilt operation, and supplies the generated driving signals MDp and MDt to an imaging direction adjustment portion 205. Further, the imaging direction control portion 204 generates a camera position information signal PM that indicates which direction is the imaging direction of the camera portion 201, and supplies the generated camera position information signal PM to the terminal control portion 210.

The imaging direction adjustment portion 205 includes a pan operation motor that causes the camera portion 201 to move in the left-right direction, and a tilt operation motor that causes the camera portion 201 to move in the up-down direction. The imaging direction adjustment portion 205 drives the pan operation motor using the driving signal MDp, and drives the tilt operation motor using the driving signal MDt. Thus, the imaging direction adjustment portion 205 adjusts the imaging direction of the camera portion 201 to the direction instructed by the direction control signal CTc. Note that it is assumed that the imaging direction adjustment portion 205 performs a continuous pan operation without limitation on its movement range.

Figure 3A:
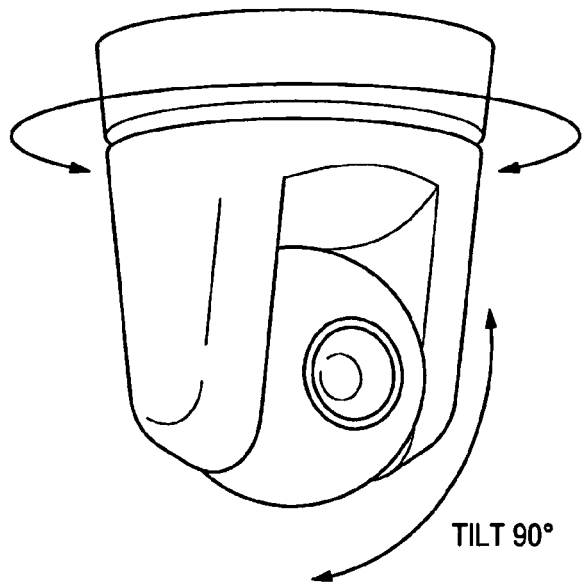
FIG. 3 is a schematic diagram illustrating a pan operation and a tilt operation of the camera terminal device 200.
Figure 3B:
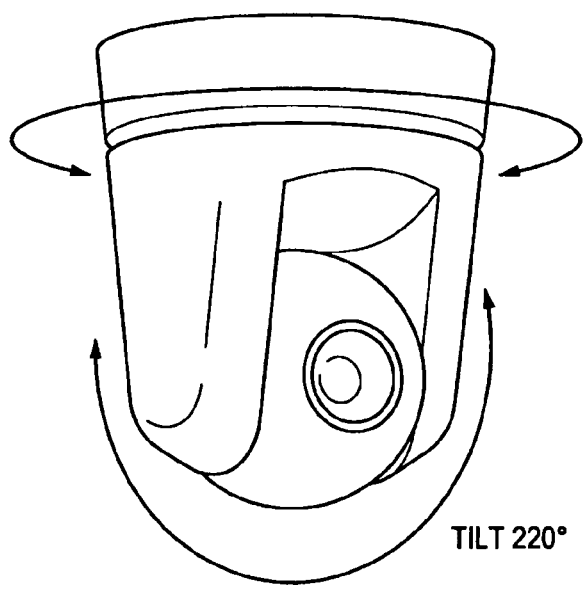

FIG. 3 is a schematic diagram illustrating a pan operation and a tilt operation of the camera terminal device 200, and shows a case in which the camera terminal device 200 is attached to a ceiling or the like. FIG. 3B shows a pan/tilt operation of the camera terminal device 200 according to the present embodiment. On the other hand, FIG. 3A shows, for comparison, a pan/tilt operation of a general camera terminal device. As shown in FIG. 3A, in the general camera terminal device, a continuous 360-degree pan operation is performed, and the tilt operation is performed over a range of 90 degrees from a vertical direction to a horizontal direction. In contrast, in the camera terminal device 200 according to the present embodiment, a continuous 360-degree pan operation is performed, and the tilt operation is performed over a range of 220 degrees centered on the vertical direction. Accordingly, the video signal DF of the first panorama image can be generated using a technique that will be described later and can be stored in the panorama image storage portion 207. The first panorama image that will be described later is a circular panorama image. When the imaging direction is operated across the center in the vicinity of the center of the circle, the camera terminal device 200 according to the present embodiment can also mechanically move to a target-imaging direction in the shortest distance. In contrast, in the general camera terminal device, it is not possible to mechanically move the camera imaging direction across the center of the circle.

The network interface portion 206 is an interface to perform communication between the camera terminal device 200 and the center server 300 via the network 500.

The terminal control portion 210 controls the camera portion 201 using the imaging control signal CTa, controls the signal processing portion 202 using the signal processing control signal CTb, and controls the imaging direction control portion 204 using the direction control signal CTc. Thus, the terminal control portion 210 performs image capture while sequentially moving the imaging direction. Then, based on the obtained video signal Dcam, the terminal control portion 210 generates the first panorama image signal DF and the second panorama image signal DP and stores them in the panorama image storage portion 207.

The imaging system 100 according to the present embodiment can transmit, from the camera terminal device 200 to the center server 300, a live image generated based on the video signal Dcam, together with the first panorama image generated based on the first panorama image signal DF or the second panorama image generated based on the second panorama image signal DP, and can display them on the monitor 320. Note that, in this specification, there are cases in which the first panorama image or the second panorama image is referred to as the whole image. FIG. 4 is a schematic diagram showing display states of the second panorama image and the first panorama image. The center server 300 can display on the monitor 320 one of the first panorama image and the second panorama image in accordance with a user selection, together with the live image. Further, the center server 300 may be structured such that it displays both the first panorama image and the second panorama image together with the live image. Note that, the circular panorama image on the right side of FIG. 4, in which an image in the vicinity of the center is missing, is shown as the first panorama image. However, the first panorama image is not limited to this example, and a circular panorama image in which the image in the vicinity of the center is not missing may be used as the first panorama image.

The camera terminal device 200 is placed on a ceiling or the like, and displays an image in a downward direction from the camera terminal device 200. Therefore, as shown in FIG. 4, the first panorama image is acquired over a range of pan 360 degrees and tilt 220 degrees, centered on a vertical line extending downward from the camera terminal device 200, and the contour of the first panorama image is circular.

Further, the imaging direction adjustment portion 205 is structured such that it can perform the pan operation continuously as described above. Therefore, it is assumed that the second panorama image that is stored in the panorama image storage portion 207 is formed such that the image does not overlap as shown in FIG. 4. For example, it is assumed that one end of the second panorama image has an angle difference of "+180 degrees" from a reference direction, and the other end of the second panorama image has an angle difference of "−180 degrees" from the reference direction. Further, since an operation range of the pan operation is not limited, a center position of the operation range cannot be taken as the reference direction, in contrast to a case in which the operation range is limited, for example. Accordingly, the reference direction is set in advance and the second panorama image signal DP is generated such that this reference direction corresponds to the center position of the second panorama image. The imaging direction control portion 204 generates, as the camera position information signal PM, a signal indicating, for example, an angle difference of the imaging direction with respect to the reference direction set in advance.

If the reference direction is set in advance in this manner, there is no need to determine which direction is taken as the reference in an imaging operation to generate the second panorama image. Further, if the angle difference of the imaging direction with respect to the reference direction is indicated by the camera position information signal PM, the position of the imaging direction based on the camera position information signal PM can be easily determined on the second panorama image.

Also in the tilt operation, it is assumed that the reference direction is set in advance and the angle difference of the imaging direction with respect to the reference direction is indicated by the camera position information signal PM. Thus, both on the first panorama image and the second panorama image, the position of the imaging direction based on the camera position information signal PM can be easily determined. Note that, in the tilt operation, when the camera terminal device 200 is placed on the ceiling, the vertical direction can be taken as the reference direction.

The terminal control portion 210 analyses a command signal CM that is supplied from the center server 300 via the network interface portion 206, and generates the imaging control signal CTa, the signal processing control signal CTb and the direction control signal CTc. Further, the terminal control portion 210 performs processing to transmit, to the center server 300, the video coding signal DV stored in the memory portion 203, the first panorama image signal DF and the second panorama image signal DP that are stored in the panorama image storage portion 207, and the camera position information signal PM supplied from the imaging direction control portion 204.

A network interface portion 301 of the center server 300 is an interface to perform communication between the camera terminal device 200 and the center server 300 via the network 500. The network interface portion 301 supplies the video coding signal DV supplied from the camera terminal device 200 to an extension processing portion 302. Further, the network interface portion 301 supplies the camera position information signal PM to a position determination processing portion 303, and supplies the first panorama image signal DF and the second panorama image signal DP to an image processing portion 304.

The extension processing portion 302 performs extension processing of the video coding signal DV and supplies the obtained video signal Dcam to a display processing portion 305.

The position determination processing portion 303 determines which position in the first panorama image or the second panorama image corresponds to the imaging direction indicated by the camera position information signal PM, and supplies a position determination result KP to the image processing portion 304. Here, if it is assumed that the camera position information signal PM generates the first panorama image signal DF or the second panorama image signal DP such that the reference direction set in advance as described above is the center position of the pan operation and the tilt operation and such that the camera position information signal PM indicates an angle difference between the reference direction and a current imaging direction, it is easily determined, based on the camera position information signal PM, which position in a bird's eye view image (i.e., the first panorama image) or in the second panorama image corresponds to the current imaging direction.

The image processing portion 304 performs image processing based on the position determination result KP, and generates a first panorama image signal DFC of the first panorama image and a second panorama image signal DPC of the second panorama image. Regarding the second panorama image signal DPC, it is possible to generate the second panorama image signal DPC in which the position determined by the position determination result KP is set as the center position. In this case, the image processing portion 304 determines a difference amount between the determined position and the center position of the second panorama image. Then, based on the determined difference amount, the second panorama image is processed such that the determined position becomes the center position of the image. More specifically, a display image frame of the second panorama image of "±180 degrees" is set with the determined position being the center position, and the second panorama image of a region corresponding to the difference amount that deviates from the display image frame of the second panorama image is pasted to a region with no image. Thus, the second panorama image signal DPC of the second panorama image in which the determined position is set as the center position is generated. Also in the case of the first panorama image signal DFC, when in a "mode for rotating the first panorama image" that will be described later, in a similar manner to the second panorama image signal DPC, a difference amount between a determined position and a reference position in the pan direction of the first panorama image is determined, and based on the determined difference amount, the first panorama image is processed such that the determined position is placed on the image. Note that, in a case where the position determined by the position determination result KP is not set as the center position, the image processing portion 304 generates the first panorama image signal DFC of the first panorama image and the second panorama image signal DPC of the second panorama image, based on the first panorama image signal DF and the second panorama image signal DP, respectively, without changing the center position. Further, the image processing portion 304 displays a position based on the position determination result KP (i.e., a position toward which an optical axis of the imaging optical system of the camera portion 201 is directed) in each of the first panorama image signal DFC and the second panorama image signal DPC. Further, the image processing portion 304 supplies, to the display processing portion 305, the first panorama image signal DFC and the second panorama image signal DPC that have been generated by performing the image processing.

The display processing portion 305 generates a display driving signal HD using the video signal Dcam supplied from the extension processing portion 302 and the first panorama image signal DFC and the second panorama image signal DPC that are supplied from the image processing portion 304, and supplies the generated display driving signal HD to the monitor 320. Further, the display processing portion 305 generates the display driving signal HD using a GUI video signal that is generated based on a GUI display control signal CTg supplied from the control portion 310 that will be described later, and supplies the generated display driving signal HD to the monitor 320. The display processing portion 305 can perform control such that live images and panorama images transmitted from the plurality of camera terminal devices 200 are displayed as a list on the monitor 320.

The monitor 320 drives a display element (for example, a liquid crystal display element or a plasma display element), a cathode-ray tube or the like based on the display driving signal HD, and thereby displays on the screen the first panorama image, the second panorama image in which the imaging direction is set to the center position, an image (a live image) captured by the camera portion 201, a GUI image and the like.

A GUI is used in a user interface portion 315, and the user interface portion 315 presents information to the user using the monitor 320. When a user operation is performed using an operation input device, such as a pointing device, a keyboard or the like, based on the presented information, the user interface portion 315 supplies an operation signal US in accordance with the user operation to the control portion 310, and causes a desired operation to be performed.

Based on the operation signal US and a display state of the monitor 320, the control portion 310 determines which processing the user has selected or which processing the user has requested. Then, the control portion 310 generates a control signal CTm based on a determination result, and supplies the generated control signal CTm to each portion, thereby controlling an operation of the center server 300. Further, the control portion 310 generates the command signal CM based on the determination result, and supplies the generated command signal CM to the camera terminal device 200 via the network interface portion 301, thereby controlling an operation of the camera terminal device 200. Further, the control portion 310 generates the GUI display control signal CTg and supplies it to the display processing portion 305.

In the above-described examples, the camera terminal device 200 generates the video signal DF of the first panorama image and the video signal DP of the second panorama image from the video signal Dcam. However, the center server 300 or the client 400 may generate the video signal DF of the first panorama image and the video signal DP of the second panorama image. In this case, the network interface portion 206 of the camera terminal device 200 transmits the video signal Dcam output from the camera portion 201 to the center server 300 or to the client 400. If the center server 300 or the client 400 is provided with a signal processing portion similar to that of the camera terminal device 200, the center server 300 or the client 400 can generate the video signal DF of the first panorama image and the video signal DP of the second panorama image. The video signal DF of the first panorama image and the video signal DP of the second panorama image are stored in a memory, such as a hard disk, provided in the center server 300 or the client 400.

(3) Display Operations of First Panorama Image and Second Panorama Image

Next, display operations of the first panorama image and the second panorama image will be explained. When an operation is started, the control portion 310 transmits to each of the camera terminal devices 200 the command signal CM that requests transmission of the first panorama image signal DF, the second panorama image signal DP, the camera position information signal PM and the video coding signal DV. When the first panorama image signal DF and the second panorama image signal DP are stored in the panorama image storage portion 207, the camera terminal device 200 reads out the first panorama image signal DF and the second panorama image signal DP and transmits them to the center server 300. On the other hand, when the first panorama image signal DF or the second panorama image signal DP is not stored in the panorama image storage portion 207, the camera terminal device 200 controls the camera portion 201, the signal processing portion 202 and the imaging direction control portion 204, and performs an imaging operation while moving the imaging direction. Thus, the camera terminal device 200 generates the first panorama image signal DF and the second panorama image signal DP, and transmits them to the center server 300. Note that the camera terminal device 200 stores the generated first panorama image signal DF and the second panorama image signal DP in the panorama image storage portion 207.

The camera terminal device 200 supplies the camera position information signal PM generated in the imaging direction control portion 204 to the center server 300. Further, the camera terminal device 200 starts the imaging operation of the camera portion 201, compresses the obtained video signal Dcam in the signal processing portion 202, and stores the video coding signal DV in the memory portion 203. Further, the camera terminal device 200 supplies the video coding signal DV stored in the memory portion 203 to the center server 300. Note that, when the camera terminal devices 200 and the network 500 are connected via the proxy server 600 as shown in FIG. 1, information is transmitted and received between each of the camera terminal devices 200 and the center server 300 via the proxy server 600.

The position determination processing portion 303 of the center server 300 determines which position in the first panorama image or the second panorama image corresponds to the imaging direction indicated by the camera position information signal PM, and supplies the position determination result KP to the image processing portion 304. If the second panorama image is taken as an example, when, for example, the angle difference indicated by the camera position information signal PM is "0 degrees", because the imaging direction is set to the reference direction, the position of the imaging direction is the center position of the second panorama image.

The image processing portion 304 performs the image processing based on the position determination result KP. When the position determination result KP indicates that the position of the imaging direction is the center position of the second panorama image, an image in the imaging direction corresponds to the center of the second panorama image. Therefore, the image processing of the second panorama image is not performed, and the second panorama image signal DP is supplied to the display processing portion 305 as the second panorama image signal DPC. On the other hand, when the position of the imaging direction is not the center position of the second panorama image, a difference amount between the determined position of the imaging direction and the center position of the second panorama image is determined. Then, based on the determined difference amount, the second panorama image is processed such that the determined position corresponds to the center position of the image, and the second panorama image signal DPC is generated.

Therefore, in the second panorama image, when, for example, the angle difference indicated by the camera position information signal PM is "0 degrees", an image captured by the camera portion 201, the second panorama image in which the reference direction corresponds to the center position, and an image relating to the GUI are displayed on the screen of the monitor 302 that is driven by the display driving signal HD supplied from the display processing portion 305.

In the case of the first panorama image, when in the "mode for rotating the first panorama image" that will be described later, in a similar manner to the second panorama image signal DPC, a difference amount between the determined position and the reference position in the pan direction of the first panorama image is determined. Then, based on the determined difference amount, the first panorama image is rotated such that the determined position is placed below the image (on a center line L to be described later), and the first panorama image signal DFC is generated. The image processing portion 304 displays the position (i.e., the position toward which the optical axis of the imaging optical system of the camera portion 201 is directed) of the imaging direction based on the position determination result KP, in each of the first panorama image signal DFC and the second panorama image signal DPC.

In either of the first panorama image and the second panorama image, the reference position set in advance can be fixed and displayed as the center position. In this case, a difference amount between the position determined by the position determination result KP and the reference position set in advance is determined, and based on the determined difference amount, a cursor, a frame or the like, which indicates that the imaging direction (the direction of the optical axis of the optical system included in the camera portion 201) of the camera is directed to a position that is removed from the center position by the difference amount, is displayed in the first or second panorama image.

The extension processing portion 302 extends the video coding signal DV, and supplies the obtained video signal Dcam to the display processing portion 305. The control portion 310 supplies the GUI display control signal CTg for performing GUI display to the display processing portion 305.

(4) Processing to Generate First Panorama Image

Figure 5:
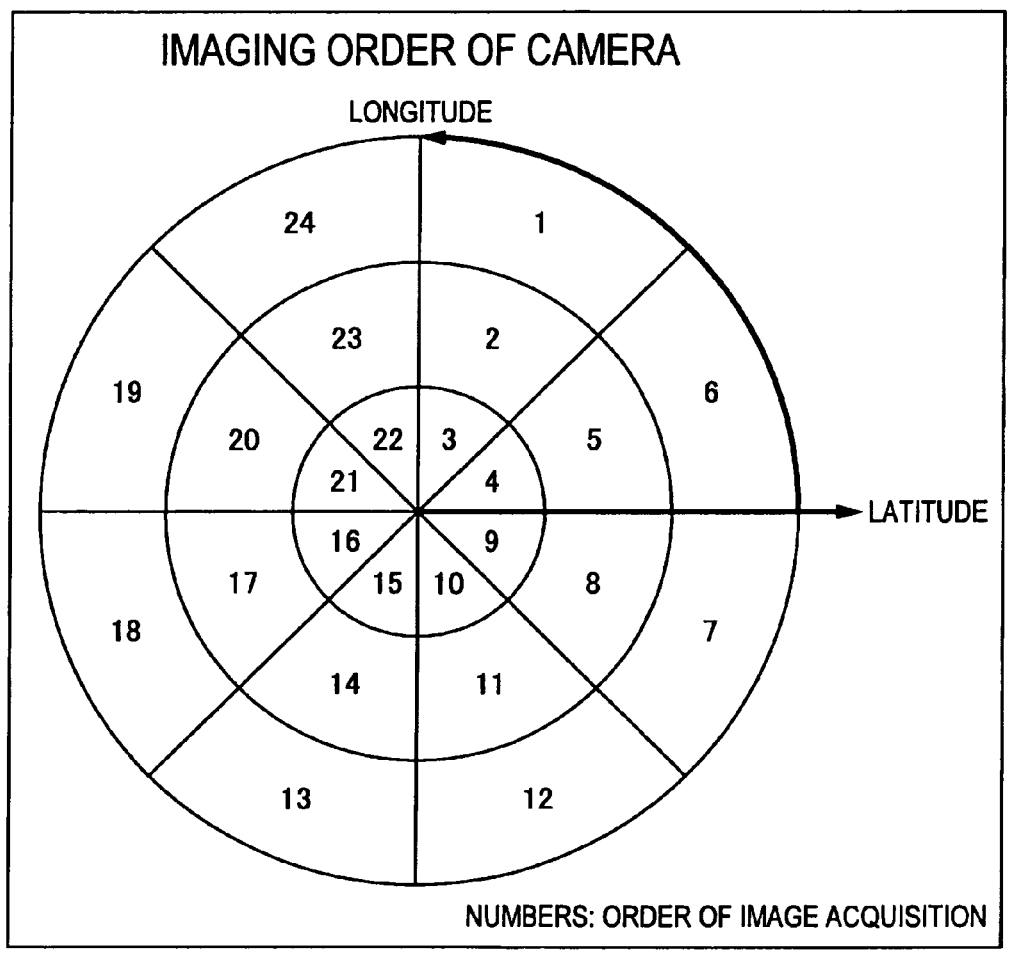
FIG. 5 is a schematic diagram illustrating processing to generate a bird's eye view image signal DF.

Next, processing to generate the first panorama image signal DF will be explained with reference to FIG. 5 to FIG. 8. When the first panorama image signal DF is generated, an image is acquired for each region of the first panorama image. First, as shown in FIG. 5, the zoom of the camera terminal device 200 is fixed, and a pan/tilt operation is performed at given intervals and still images are acquired. Numbers shown in FIG. 5 indicate the order of image acquisition.

Figure 6:
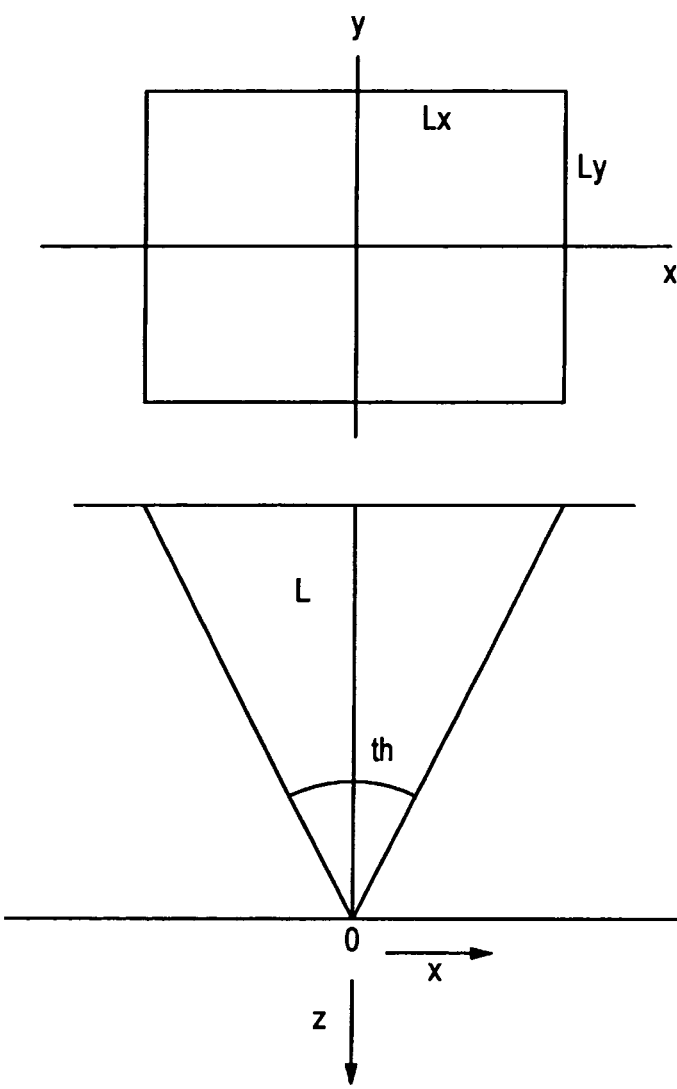
FIG. 6 is a schematic diagram illustrating the processing to generate the bird's eye view image signal DF.

Next, coordinate conversion of a still image coordinate system is performed by the following procedures [1] to [3]. Here, as shown in FIG. 6, each point of the still image is converted to a relative position (x, y, z) as viewed from the center of rotation of the camera terminal device 200.

[1] The point of view of the camera with a horizontal angle of view of thh [degrees] and an aspect ratio of "a" is set at an origin and is directed to a −z direction. If a subject plane (x, y, −L) is considered at the position of a distance L, a visible range is a rectangle of 2Lx×2Ly. Here, the following relationship is established: Lx=L·tan (thh/2), Ly=Lx/a.

[2] The posture of the camera is originally (x, y, z, p, q, r). However, considering that the position of the point of view is fixed at the origin, the equation x=y=z=0 is obtained. Therefore, here, only (p, q, r) are considered (p: pan (y axis rotation), q: tilt (x axis rotation), r: roll (z axis rotation)).

[3] When a point (j, i) in the rectangle of (2Lx)×(2Ly) is used, the following equations are established.

$$x = Lx \times (j - Lx)/Lx$$

$$y = Ly \times (i - Ly)/Ly$$

$$z = -L$$

[4] The following equations of roll conversion, tilt conversion and pan conversion are applied using (x, y, z).

Roll conversion $\qquad\qquad$ Expression 1

$$\begin{bmatrix} x1 \\ y1 \\ z1 \end{bmatrix} = \begin{bmatrix} \cos r & -\sin r & 0 \\ \sin r & \cos r & 0 \\ 0 & 0 & 1 \end{bmatrix} \cdot \begin{bmatrix} x \\ y \\ z \end{bmatrix}$$

-continued

Tilt conversion $$\begin{bmatrix} x2 \\ y2 \\ z2 \end{bmatrix} = \begin{bmatrix} 1 & 0 & 0 \\ 0 & \cos q & -\sin q \\ 0 & \sin q & \cos q \end{bmatrix} \cdot \begin{bmatrix} x1 \\ y1 \\ z1 \end{bmatrix}$$

Pan conversion $$\begin{bmatrix} x3 \\ y3 \\ z3 \end{bmatrix} = \begin{bmatrix} \cos p & 0 & -\sin p \\ 0 & 1 & 0 \\ \sin p & 0 & \cos p \end{bmatrix} \cdot \begin{bmatrix} x2 \\ y2 \\ z2 \end{bmatrix}$$

Values of the point (x3, y3, z3) obtained here correspond to values expressed in a coordinate system when a point (x, y, z) in the still image is viewed from the center of rotation of the camera.

Figure 7:
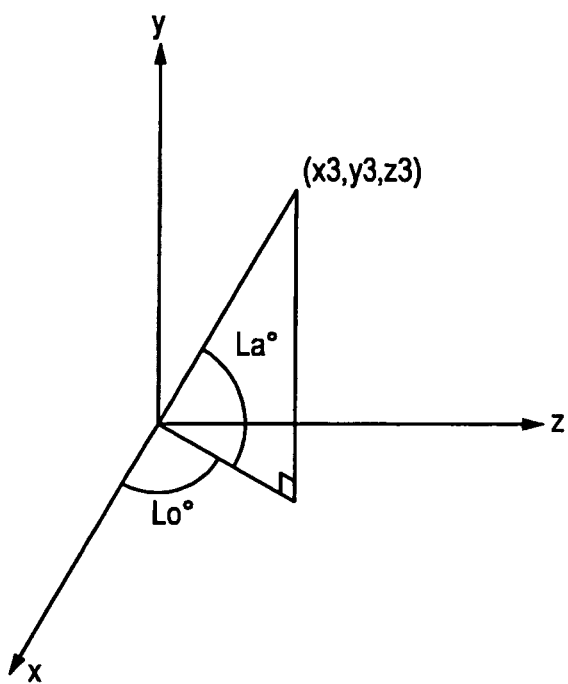
FIG. 7 is a schematic diagram illustrating the processing to generate the bird's eye view image signal DF.

Next, a relative position is converted to a latitude and longitude. Here, as shown in FIG. 7, the point (x3, y3, z3) obtained as described above is converted to a latitude and longitude. An angle between a direction of the point (x3, y3, z3) and a horizontal direction with respect to the −z direction is the longitude, and an angle between the direction of the point (x3, y3, z3) and an x-z plane is the latitude, and the latitude and longitude can be obtained by the following equations.

Latitude (La)

$$La = \tan^{-1}(y3/::\text{sqrt}(x3*x3+z3*z3))$$

Longitude (Lo)
when 0.0<z3, $$\text{if } 0.0<x3, Lo=90.0+La$$

$$\text{if } 0.0 \geq x3, Lo=-90.0-La$$

when 0.0≤z3, $$Lo=\tan^{-1}(x3/z3)/RAD$$

where RAD=π/180 (π: circle ratio)

Figure 8:
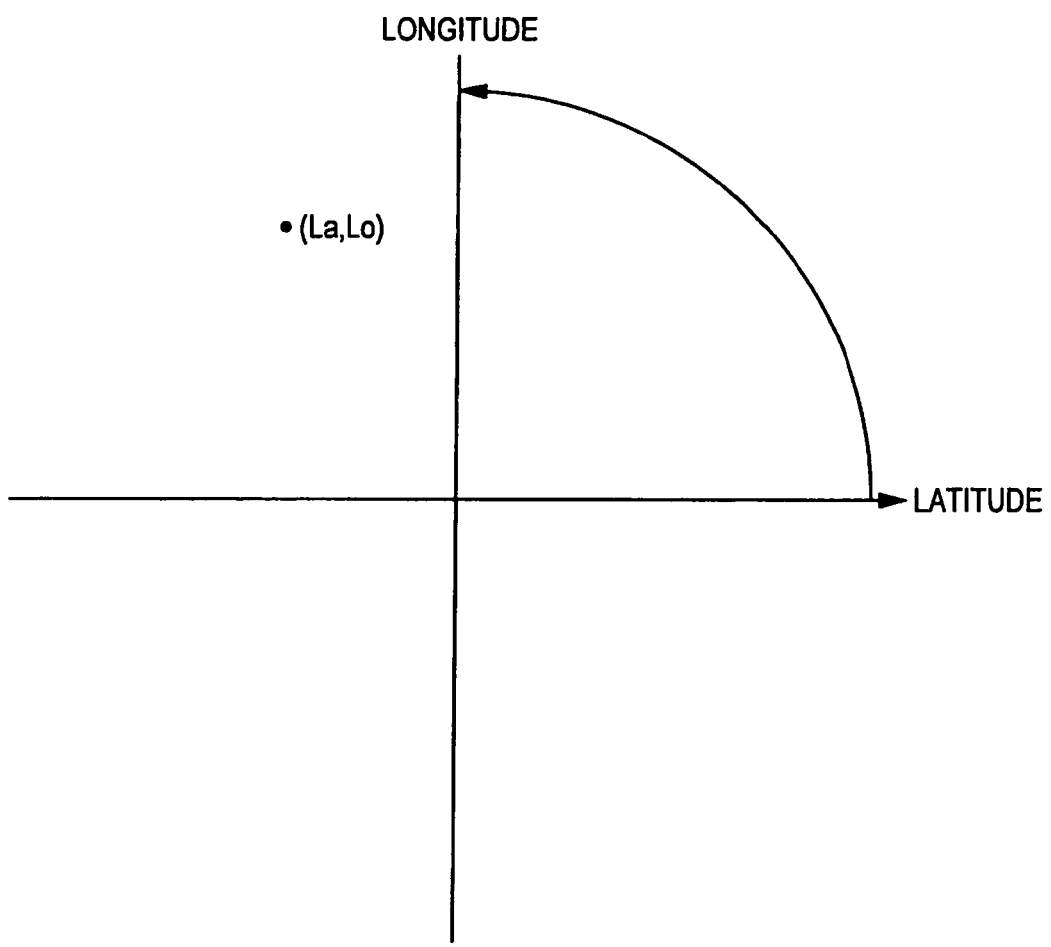
FIG. 8 is a schematic diagram illustrating the processing to generate the bird's eye view image signal DF.

Next, conversion to the first panorama image is performed. Here, as shown in FIG. 8, the obtained latitude and longitude (La, Lo) are expressed such that the latitude is indicated by a radial axis and the longitude is indicated by a circumferential coordinate system.

In the manner described above, the first panorama image signal DF can be generated.

(5) Graphical User Interface (GUI)

Next, the GUI will be explained. FIG. 9 is a schematic diagram showing display screens of the monitor 320. FIG. 9 shows both the normal screen display and the full screen display. In either case, an operation panel (a control panel) is displayed on the left side of the screen and a live image is displayed on the right side of the screen. When a "Screen Mode" of the operation panel is set to "Full", the full screen display is shown.

FIG. 10 is a schematic diagram illustrating operations on the operation panel. The operation panel includes panels for each function, and each of the panels can be folded and stored. The panels can be classified in the following manner.

Figures 10A, 10B, 10C:
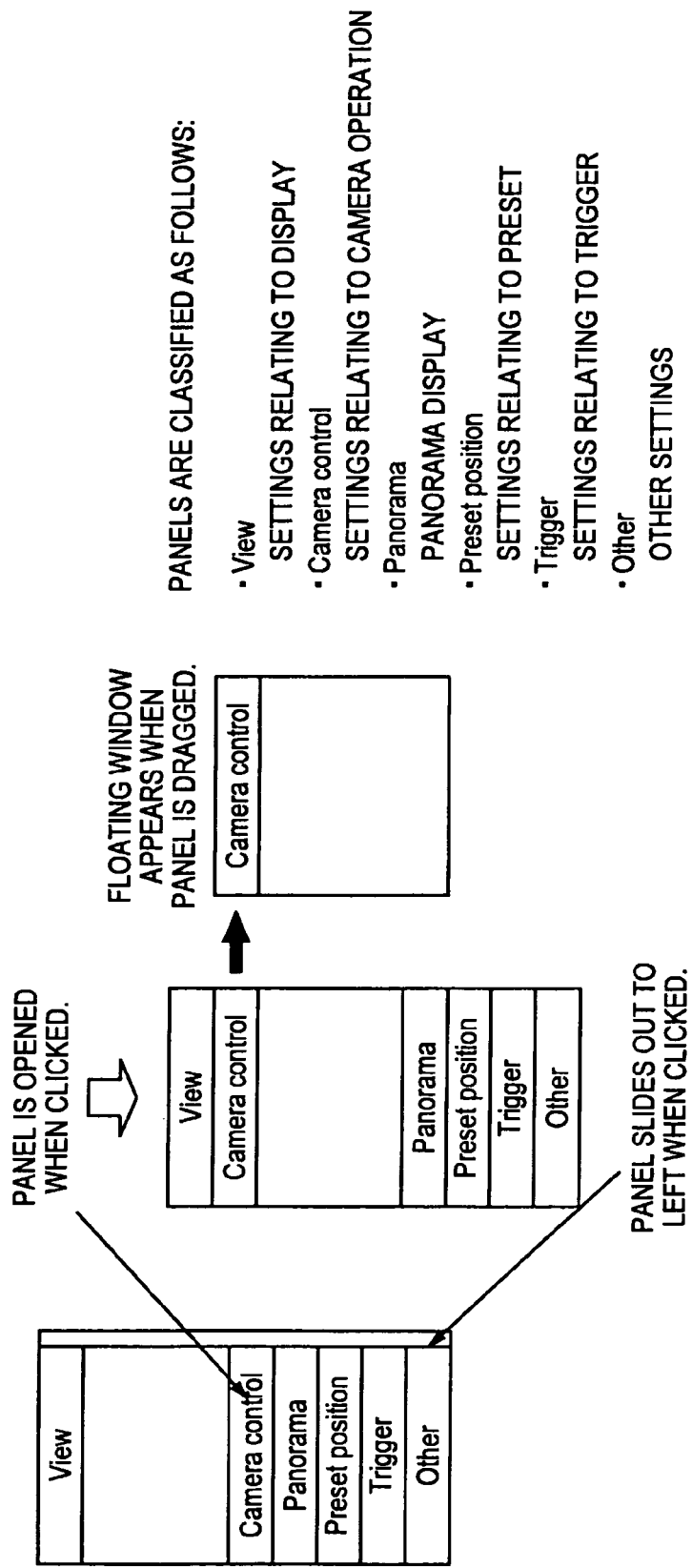
FIG. 10 is a schematic diagram illustrating operations on an operation panel.

View
    Settings relating to display
Camera control
    Settings relating to camera operation
Panorama
    Panorama display
Preset position
    Settings relating to preset
Trigger
    Settings relating to trigger
Other
    Other settings When each of the panels is clicked, the clicked panel is opened. FIG. 10A shows a state in which the panel "View" is clicked, and a menu is displayed below a "View" column. On the other hand, FIG. 10B indicates a state in which the panel "Camera control" is clicked, and a menu is displayed below a "Camera control" column. FIG. 10C indicates a state in which the panel "Camera control" is dragged, and the panel "Camera control" can be changed to a floating window by dragging it.

Figure 11:
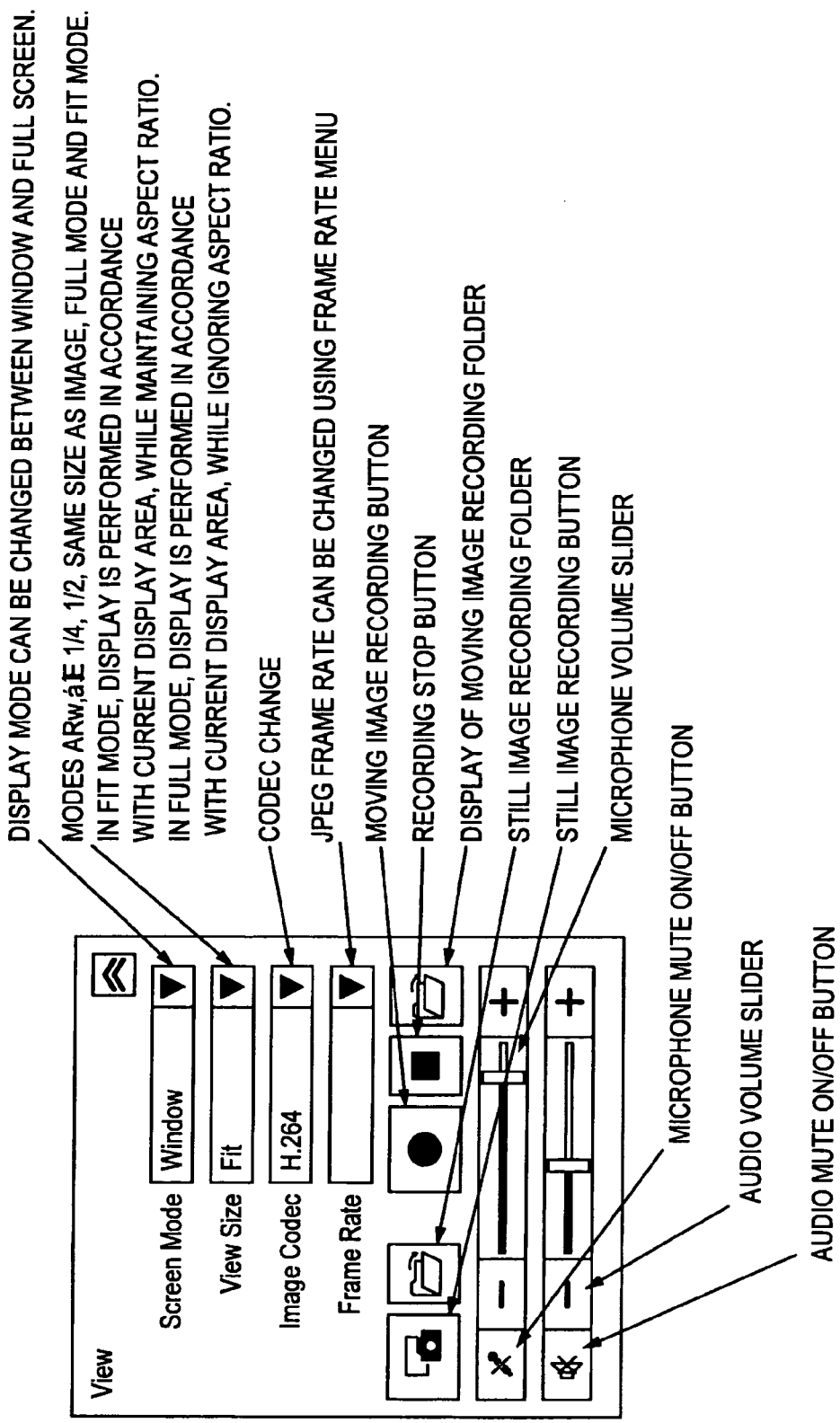
FIG. 11 is a schematic diagram showing a state in which menus such as "Screen Mode", "View Size", "Image Codec" and "Frame Rate" are displayed when a panel "View" is clicked.

FIG. 11 shows a state in which menus such as "Screen Mode", "View Size", "Image Codec" and "Frame Rate" are displayed when the panel "View" is clicked. With the "Screen Mode" menu, the display mode can be changed to a normal mode and a full screen mode. With the "View Size" menu, ¼, ½, the same size as an image, and a fit mode can be specified. In the fit mode, an image is displayed in accordance with the size of a current display area. With the "Image Codec" menu, a codec change can be performed. With the "Frame Rate" menu, a JPEG frame rate can be changed. A moving image recording button is used to record moving images, and a still image recording button is used to record still images. In addition to these buttons, a microphone volume slider, a microphone mute on/off button, an audio volume slider, an audio mute on/off button, and the like are provided.

Figure 12:
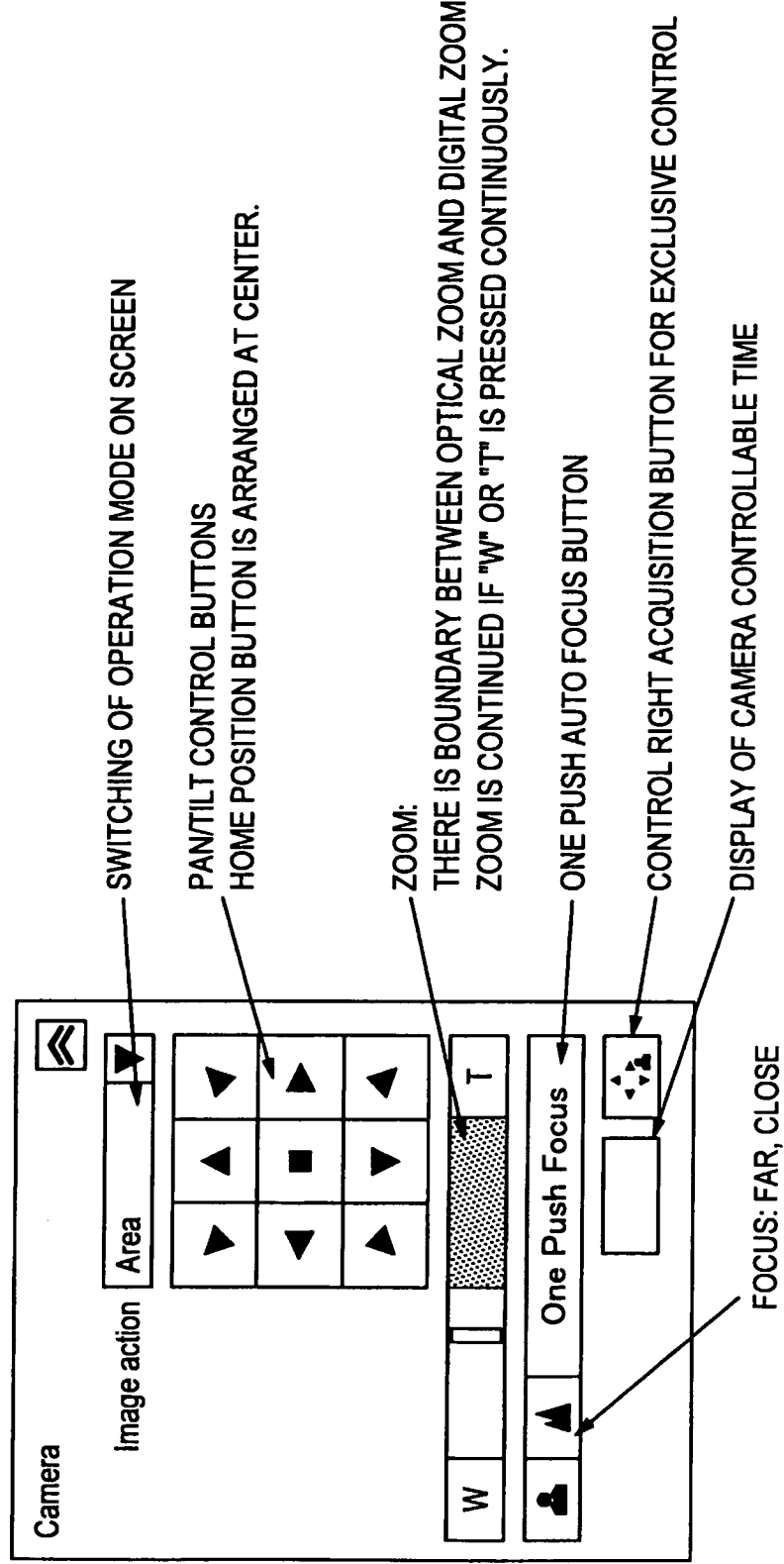
FIG. 12 is a schematic diagram showing a menu that is displayed when a panel "Camera" is clicked.

FIG. 12 shows a menu that is displayed when a panel "Camera" is clicked. With an "Operation Mode" menu, operation mode switching can be performed on an image. Pan/tilt directions can be specified by operating pan/tilt control buttons with an arrow on them. A button located in the center of the pan/tilt control buttons is a home position button. A zoom button is a button to specify the zoom of the camera terminal device 200, and it is formed such that a boundary between an optical zoom and a digital zoom can be seen. If "W" or "T" of the zoom button is pressed continuously, a zoom operation is performed continuously. A focus button is used to set the focus to a "long distance" or a "short distance". In addition to these buttons, various kinds of buttons are provided, such as a one push auto focus button and a control right acquisition button for exclusive control.

Figure 13:
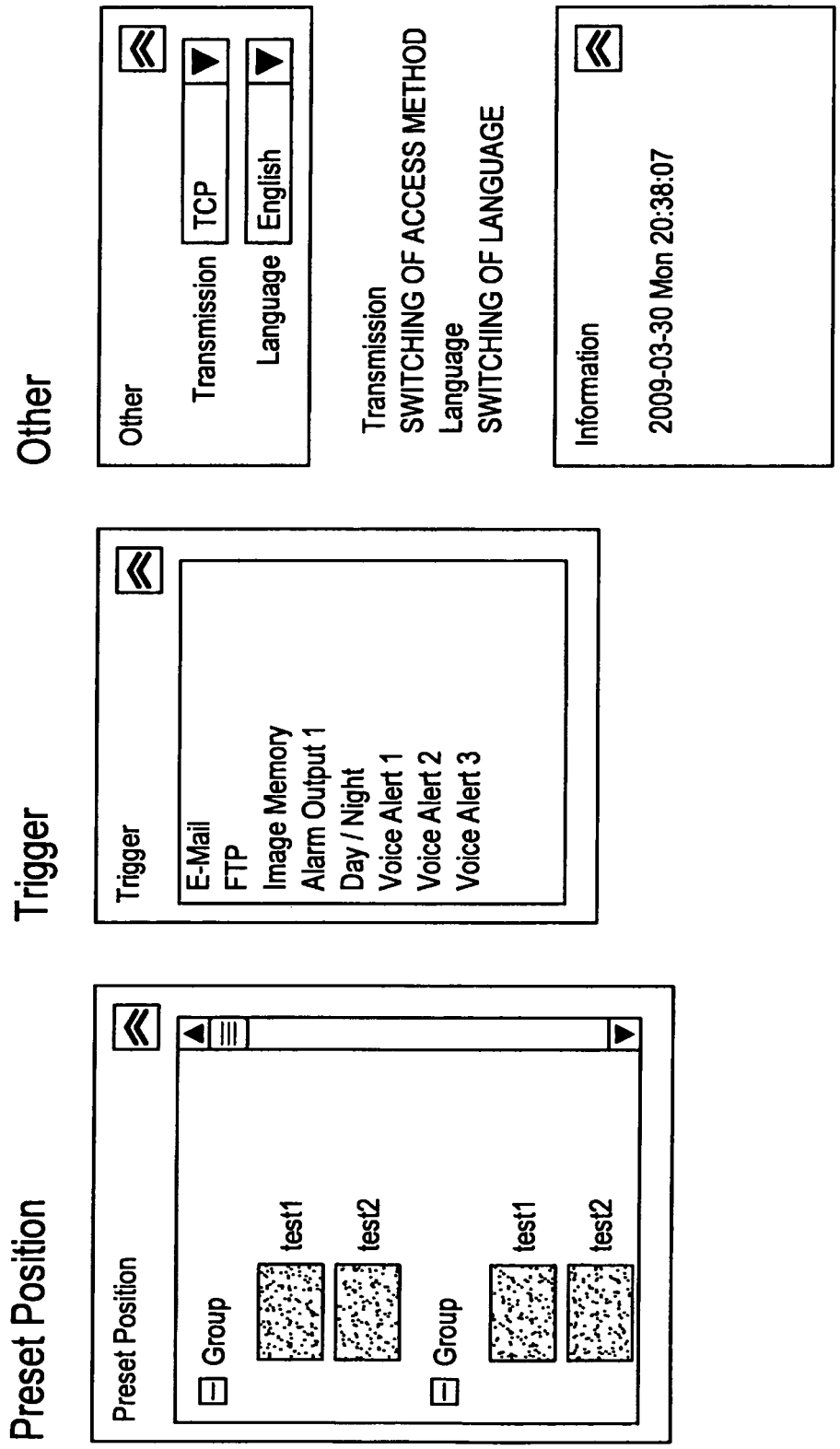
FIG. 13 is a schematic diagram showing respective menus that are displayed when "Preset Position", "Trigger", "Other" and "Information" are clicked.

FIG. 13 shows respective menus that are displayed when "Preset Position", "Trigger", "Other" and "Information" are clicked. The panel "Preset Position" displays thumbnail images in a plurality of imaging directions determined in advance. By clicking and selecting one of the thumbnail images, it is possible to direct the camera terminal device 200 in a direction of the selected thumbnail image.

(6) Specifying of Imaging Direction on First Panorama Image

Figure 14:
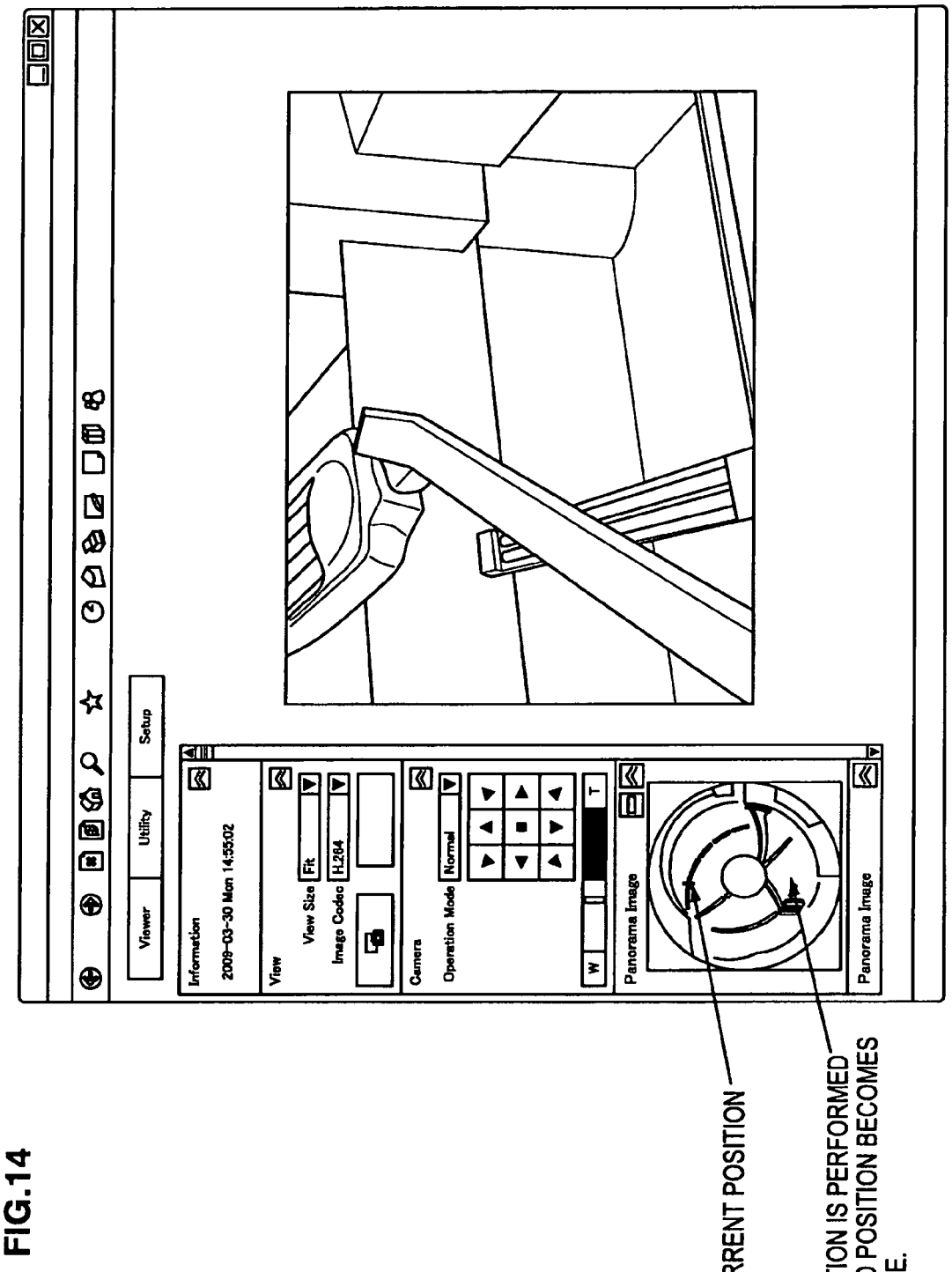
FIG. 14 is a schematic diagram illustrating display of the bird's eye view image.
Figure 15:
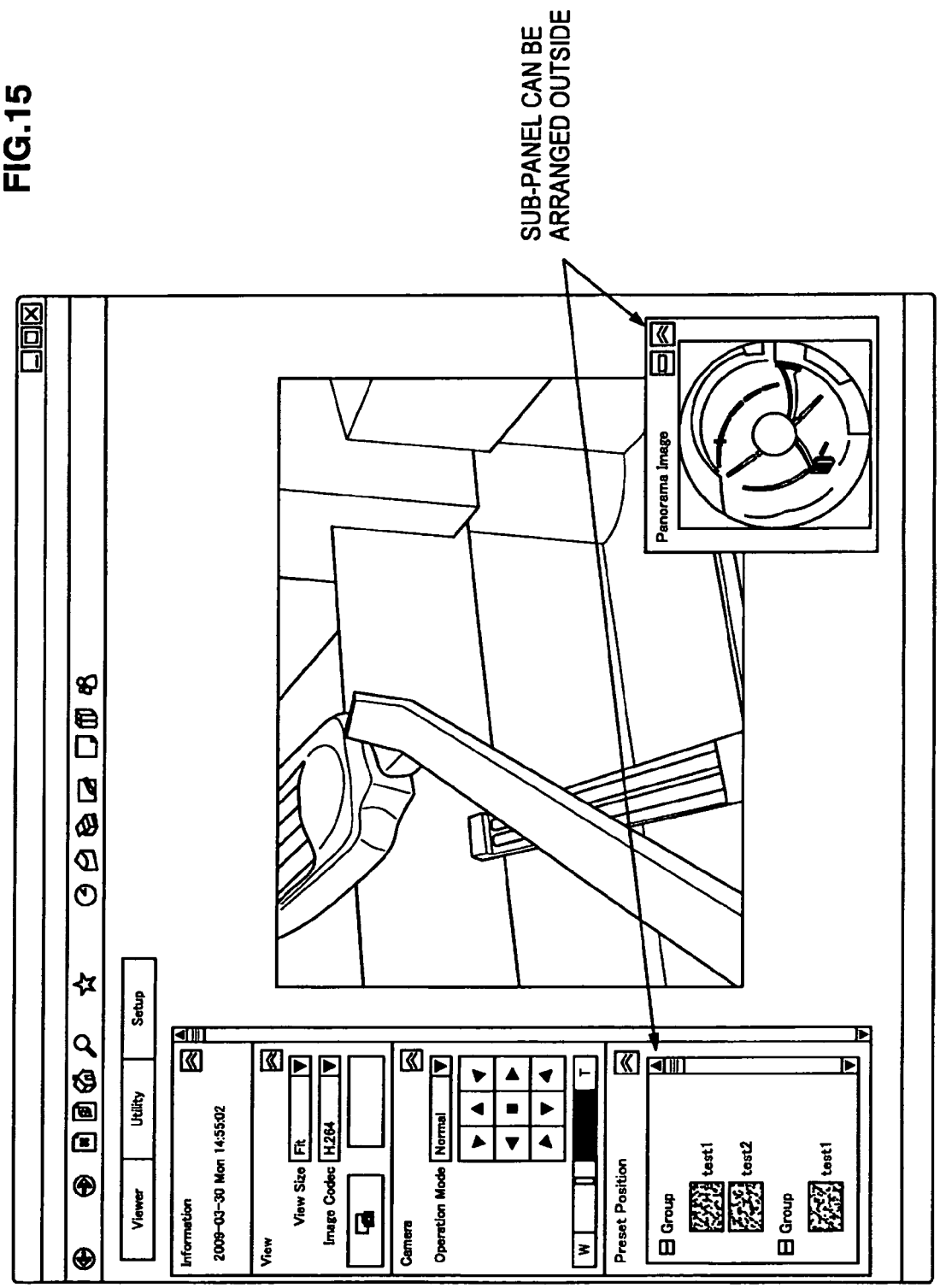
FIG. 15 is a schematic diagram illustrating display of the bird's eye view image.

Next, display of the first panorama image will be explained with reference to FIG. 14 to FIG. 18. FIG. 14 is a schematic diagram showing a state in which the first panorama image is displayed by clicking "Preset position" of the operation panel. Note that a live image is displayed on the right side of the operation panel. As described above, by dragging and moving the "Preset position" column, a sub-panel that displays the first panorama image can be arranged outside of the operation panel as shown in FIG. 15. Further, the sub-panel that displays the first panorama image can be moved within the display screen.

Figure 16:
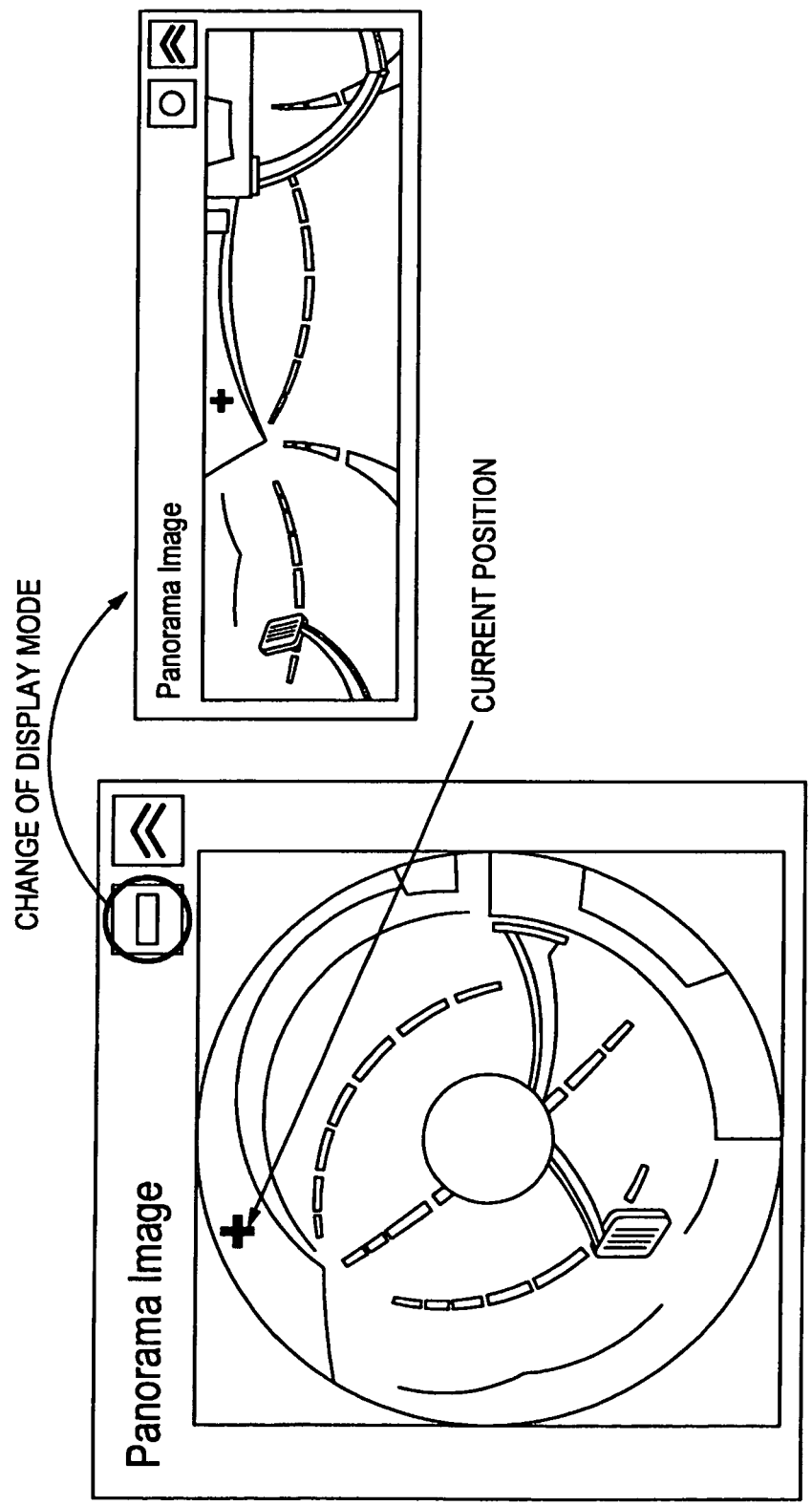
FIG. 16 is a schematic diagram illustrating display of the bird's eye view image.

FIG. 16 is a schematic diagram showing, in detail, the sub-panel that displays the first panorama image. In the first panorama image, the direction (the direction of the optical axis of the imaging optical system of the camera terminal device 200) of the image displayed in the live image on the right side is shown by a cross (+). Further, as shown in FIG. 16, the first panorama image can be switched to the second panorama image by clicking a panorama switching button arranged on the upper right side of the first panorama image.

Figure 17:
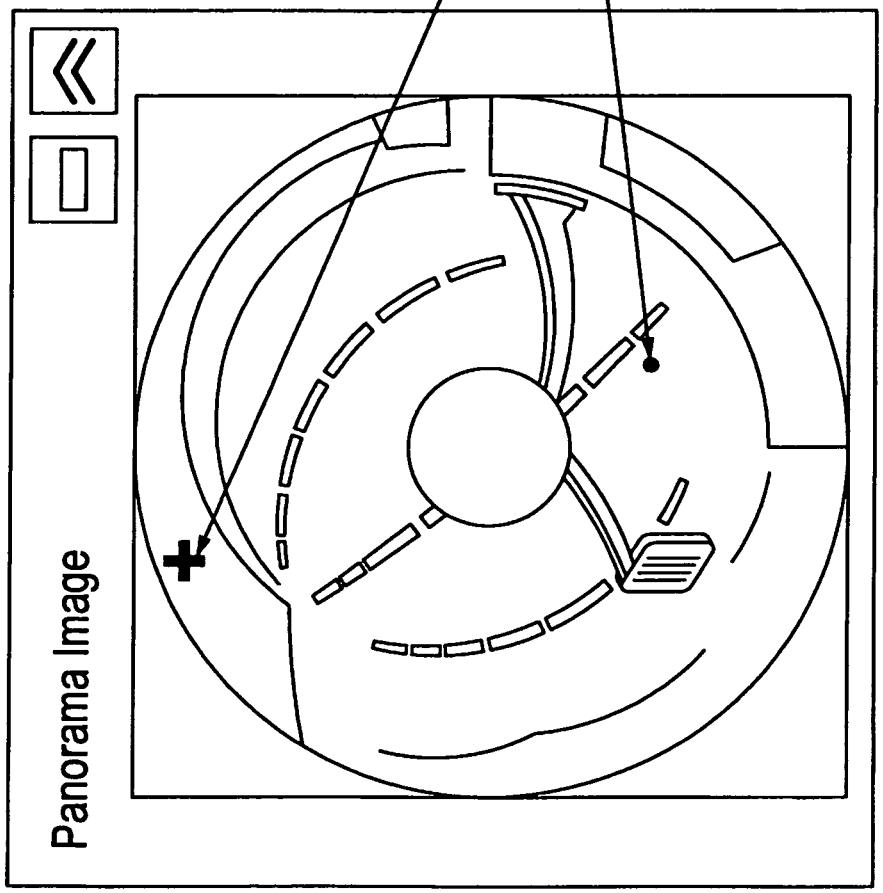
FIG. 17 is a schematic diagram illustrating display of the bird's eye view image.

FIG. 17 shows an operation to change the direction of the live image using the first panorama image. When the pan/tilt direction of the camera terminal device 200 is changed, the above-described pan/tilt control button can be used for the change. However, the pan/tilt direction of the camera terminal device 200 can also be changed by specifying a given point in the first panorama image. In the state shown in FIG. 17, the optical axis of the imaging optical system of the camera terminal device 200 is directed toward the direction of the cross (+) and the live image in that direction is displayed. In this state, if a black circle (●) shown in the first panorama image is clicked, the operation signal US in accordance with a user operation is transmitted to the control portion 310. Based on the operation signal US, the imaging direction control portion 204 of the camera terminal device 200 is controlled, and the optical axis of the imaging optical system of the camera terminal device 200 is directed toward the direction of the black circle (●). Accordingly, the live image displayed on the right side of the operation panel is switched to an image in the direction of the black circle (●).

Thus, the user can specify the pan/tilt direction of the camera terminal device 200 by specifying a given point in the first panorama image. The first panorama image includes all the images in the pan/tilt directions that can be captured by the camera terminal device 200. Therefore, the user can display the live image in a desired direction by specifying the direction of the camera terminal device 200 on the first panorama image. Note that the direction of the optical axis may be controlled by specifying a region using a frame that surrounds a predetermined range, instead of using the cross (+) that indicates a click position.

Figure 18:
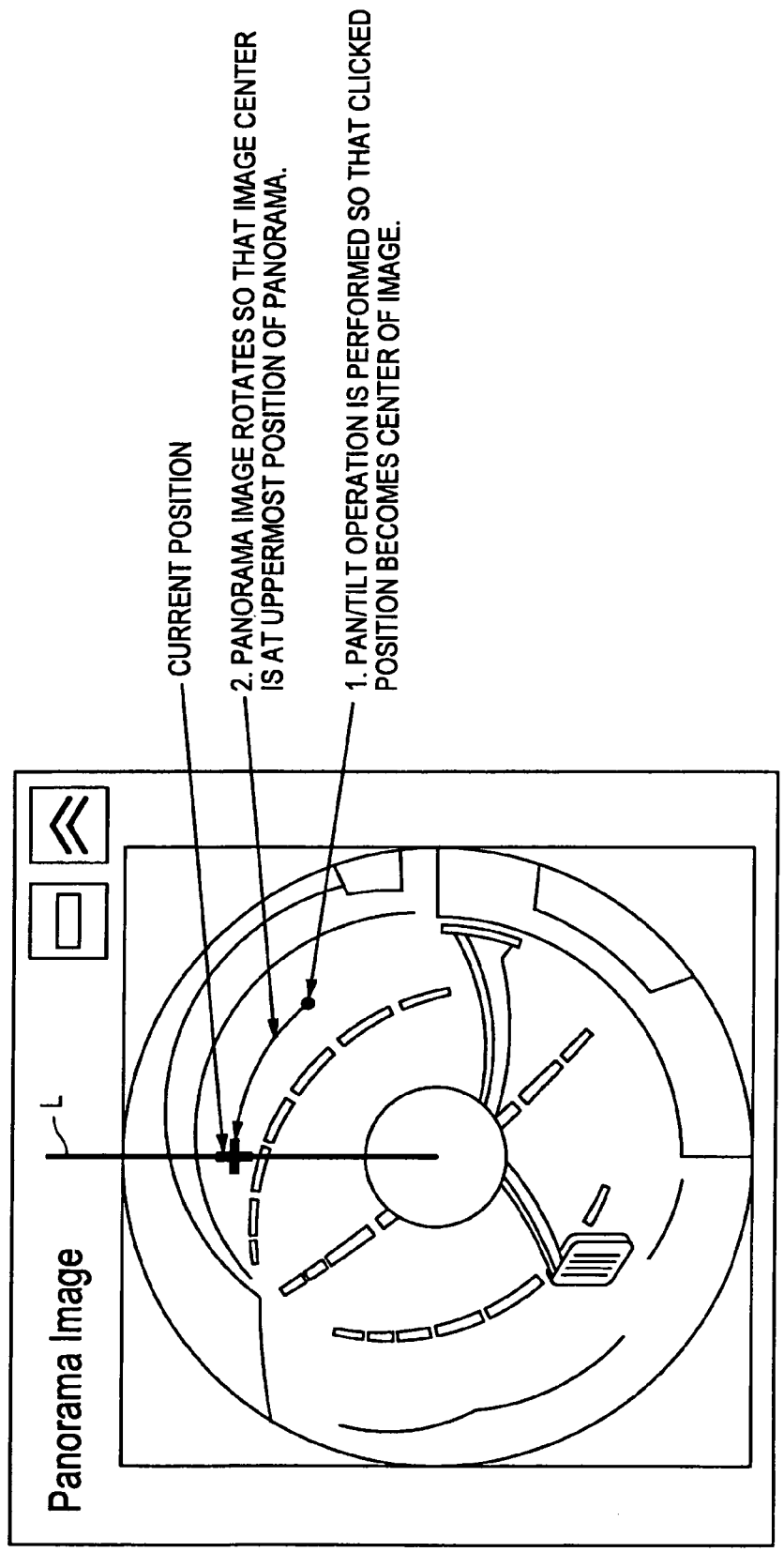
FIG. 18 is a schematic diagram illustrating display of the bird's eye view image.

When the direction of the camera terminal device 200 is specified on the first panorama image, there are two modes, namely, a mode in which the display state of the first panorama image is not changed and only the live image is switched, and a mode in which the first panorama image rotates. In the mode in which the first panorama image rotates, as shown in FIG. 18, an angle position of the first panorama image is set such that the position (indicated by the cross (+)) at which the live image is currently being displayed is positioned on a straight line L extending upward from the center of the first panorama image. Next, when the black circle (●) is clicked on the first panorama image, the live image displayed on the right side of the operation panel is switched to an image in the direction of the black circle (●). At the same time, the first panorama image rotates such that the position of the black circle (●) is located on the straight line L in the first panorama image. Accordingly, when the user looks at the first panorama image, the user can immediately recognize that the direction of the live image is on the straight line L of the first panorama image.

In a similar manner, in the second panorama image also, the user can specify the pan direction of the camera terminal device 200 by specifying a given point in the second panorama image. Based on this, the user can switch the direction of the live image.

(7) Control Using Preset Position

Next, control using a preset position in the system of the present embodiment will be explained. As described above, in the system of the present embodiment, by specifying a desired region in the first panorama image or the second panorama image, the imaging direction of the camera terminal device 200 can be directed toward the specified direction. On the other hand, when one or a plurality of preset positions are set in advance, by selecting the preset position (one of the preset positions), the imaging direction of the camera terminal device 200 can be directed toward the selected position.

Figure 19:
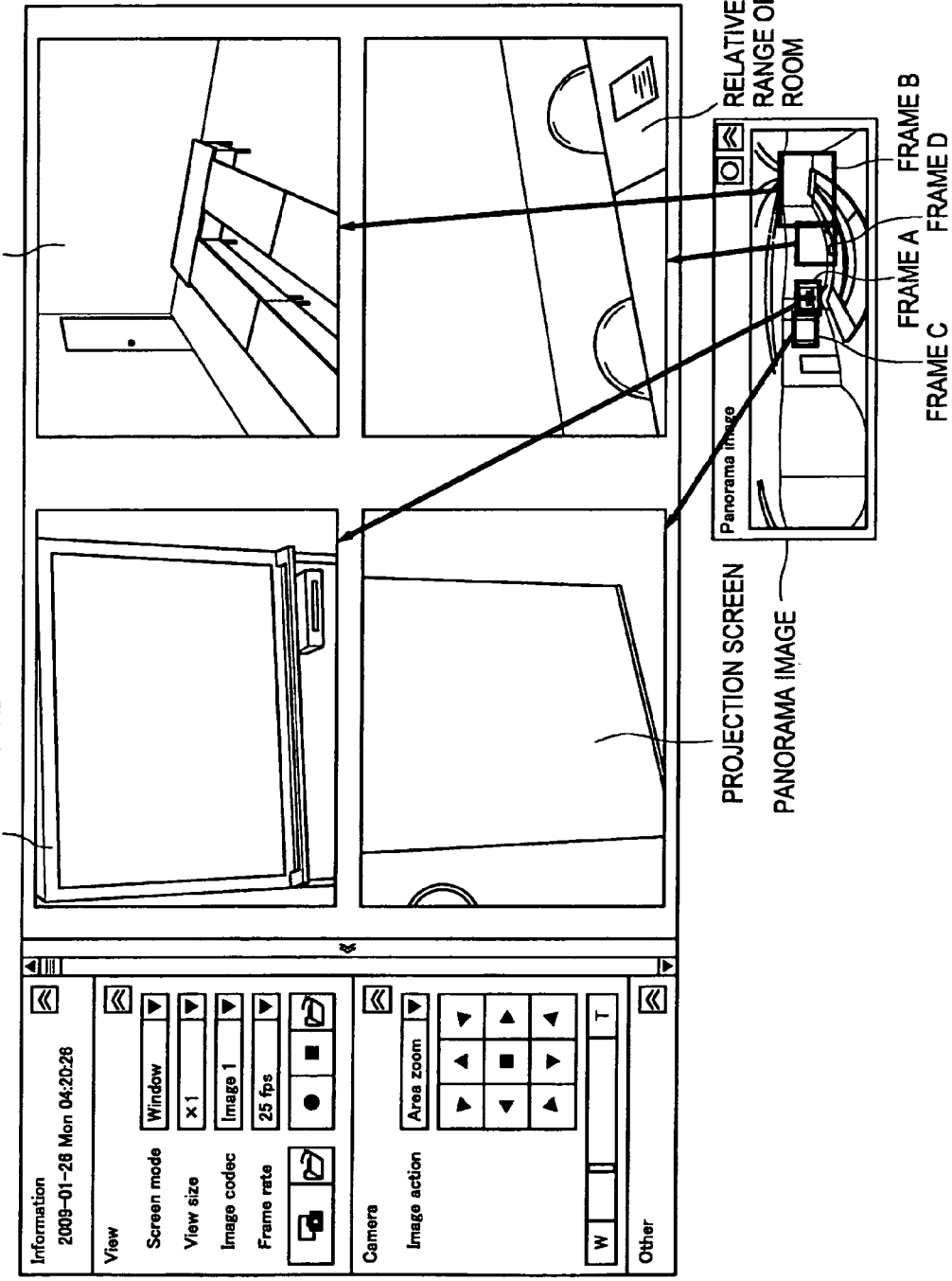
FIG. 19 is a schematic diagram showing a case in which the camera terminal device according to the present embodiment is provided in a conference room.

FIG. 19 shows, as an example, a case in which the camera terminal device 200 according to the present embodiment is provided in a conference room. In the example shown in FIG. 19, four preset positions are set for image capture by the camera terminal device 200. At each of the four preset positions, a "whiteboard", a "projection screen", a "relatively wide range of the conference room" and a "specific of the conference room" are captured. Further, in a lower part of the screen, a whole image is displayed as the second panorama image.

Ranges corresponding to the respective preset positions are displayed in the second panorama image using frames A to D. Here, the frame A corresponds to the "whiteboard", the frame B corresponds to the "relatively wide range of the conference room", the frame C corresponds to the "projection screen", and the frame D corresponds to the "relatively narrow range of the conference room".

Since the frames of the imaging ranges corresponding to the respective preset positions are displayed in this manner, the user can visually and directly determine which range in the panorama image corresponds to each of the preset positions.

The preset positions are set in advance by the user using a method that will be described later. Data of the preset positions is stored in the panorama image storage portion 207 of the camera terminal device 200, or a memory provided in the center server 300, a memory provided in the client 400 or the like.

Next, a method for displaying, from the panorama image, a live image of each of the preset positions set as described above will be explained. FIG. 20 to FIG. 23 are schematic diagrams each showing a state in which a live image is specified from among the four preset positions by selecting one of the frames A to D in the whole image shown in FIG. 19.

Figure 20:
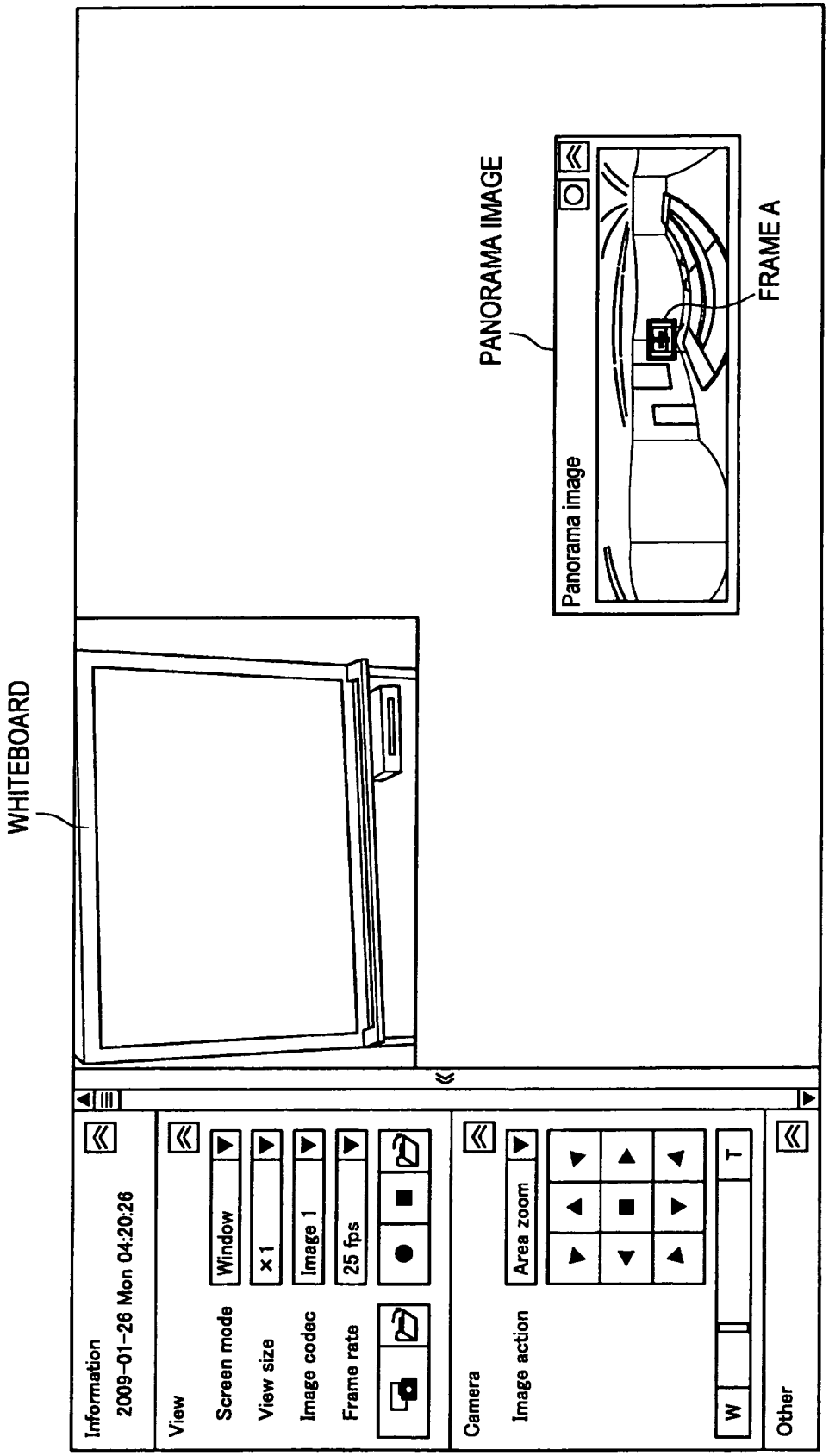
FIG. 20 is a schematic diagram showing a state in which a live image is specified from among four preset positions by selecting one of frames A to D in the whole image shown in FIG. 19.

FIG. 20 shows a state in which the frame A in the whole image is selected from the state shown in FIG. 19. The selection of the frame A can be performed by moving a cursor on the display screen to the position of the frame A in the whole image and clicking the frame A. As shown in FIG. 20, when the frame A in the whole image is clicked, the live image "whiteboard" corresponding to the frame A is displayed in a large size on the whole image.

Figure 21:
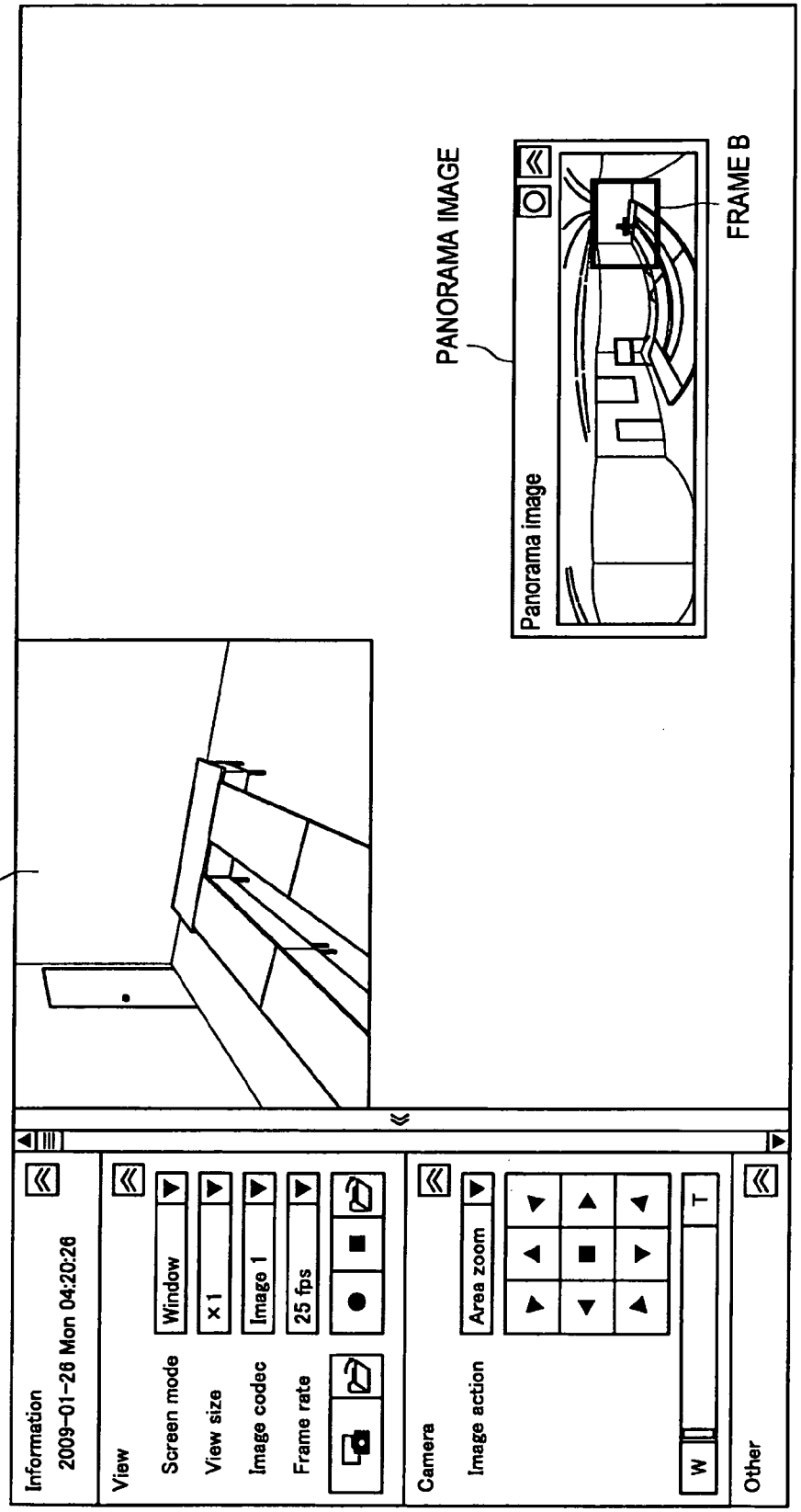
FIG. 21 is a schematic diagram showing a state in which a live image is specified from among the four preset positions by selecting one of the frames A to D in the whole image shown in FIG. 19.
Figure 22:
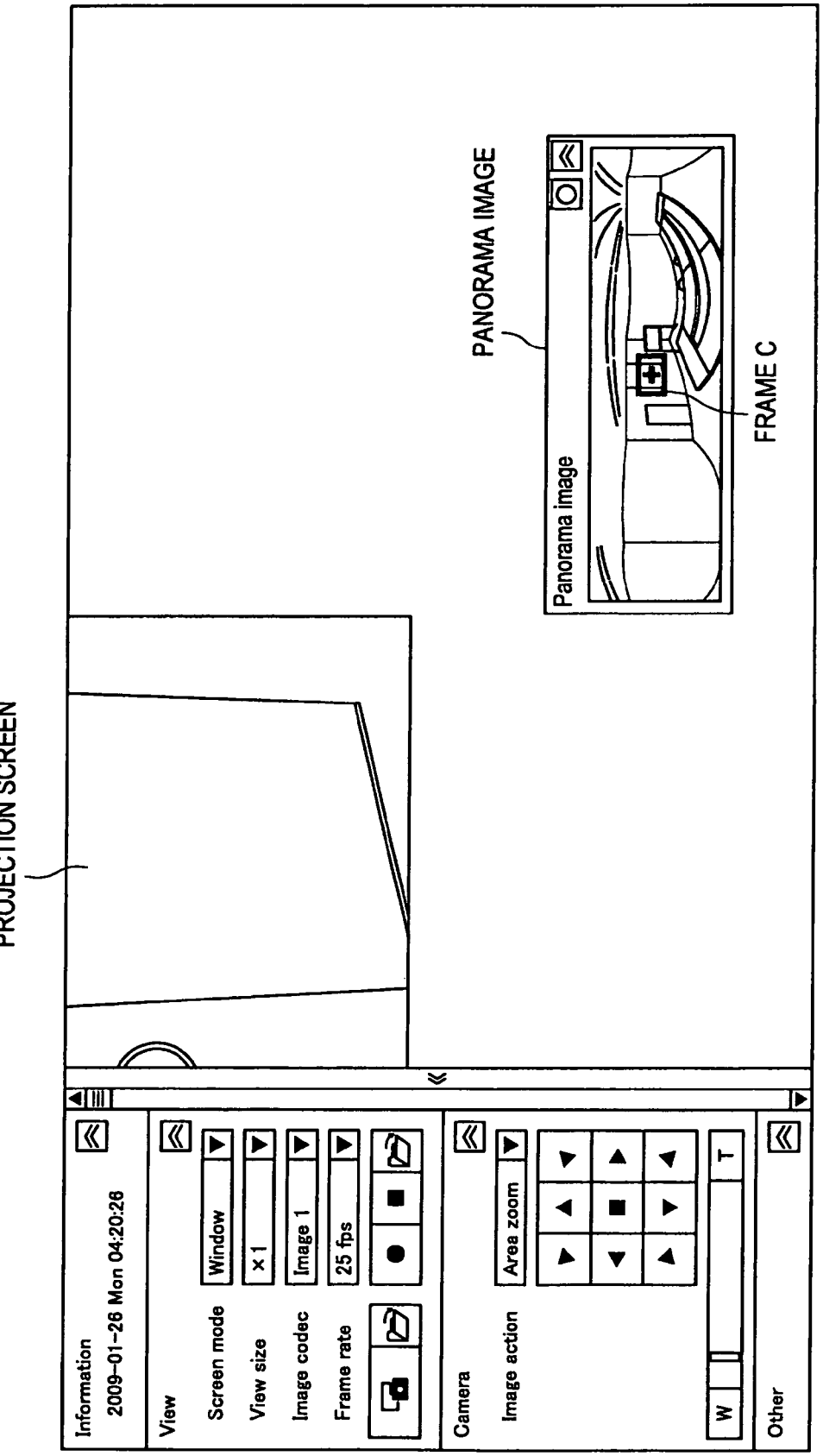
FIG. 22 is a schematic diagram showing a state in which a live image is specified from among the four preset positions by selecting one of the frames A to D in the whole image shown in FIG. 19.
Figure 23:
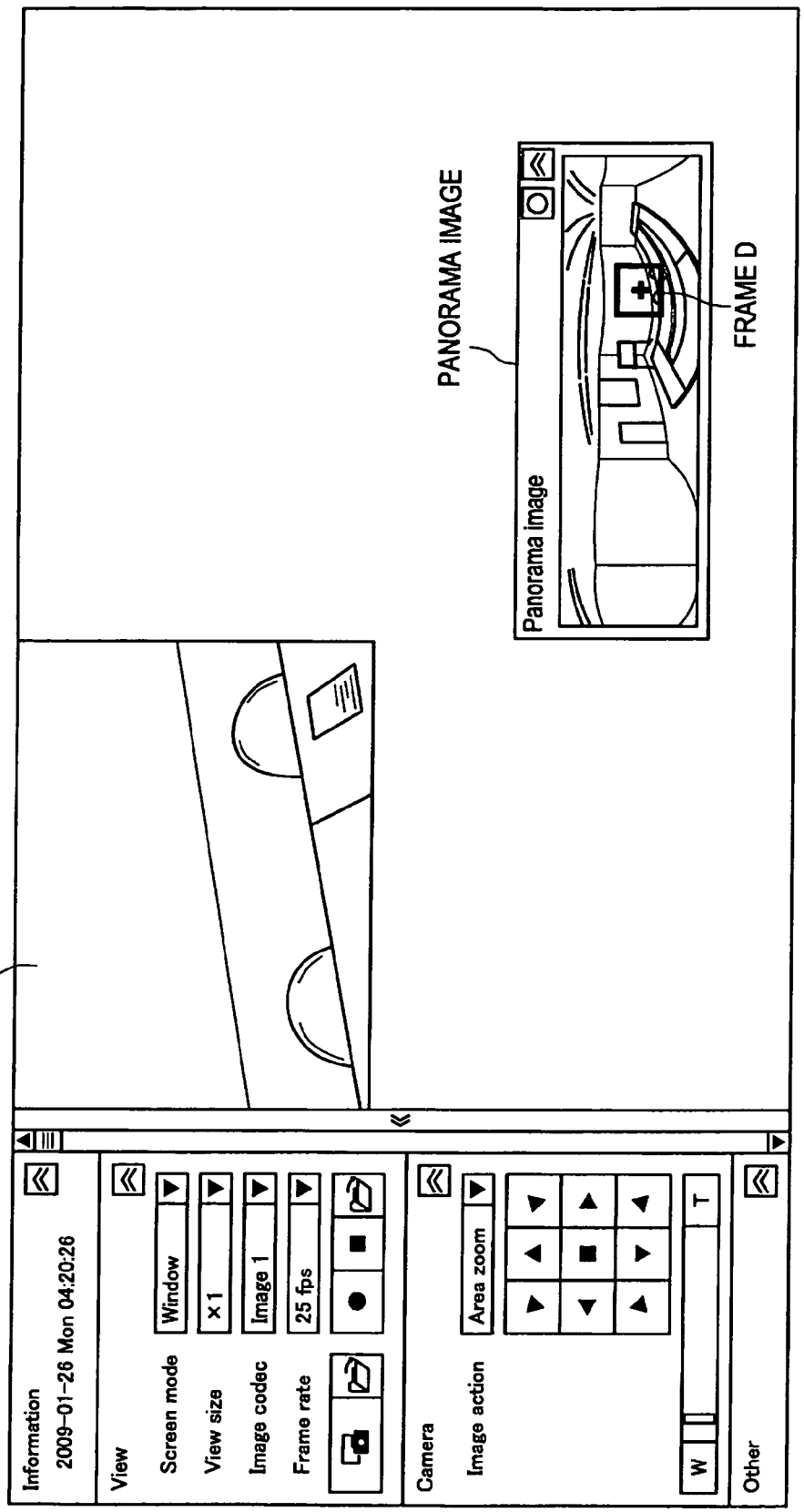
FIG. 23 is a schematic diagram showing a state in which a live image is specified from among the four preset positions by selecting one of the frames A to D in the whole image shown in FIG. 19.

In a similar manner, FIG. 21 shows a state in which the frame B in the whole image is clicked. FIG. 22 shows a state in which the frame C in the whole image is clicked. FIG. 23 shows a state in which the frame D in the whole image is clicked. As shown in FIG. 21 to FIG. 23, when the frame B, the frame C and the frame D are clicked, the live images respectively corresponding to the frame B, the frame C and the frame D are displayed. Accordingly, the user can switch and display a desired one of the live images, by selecting one of the frame A, the frame B, the frame C and the frame D while looking at the whole image.

In this case, when the user clicks one of the frames A to D, the operation signal US in accordance with the user operation is transmitted from the user interface portion 315 to the control portion 310. The operation signal US includes information of the selected one of the frames A to D (namely, the selected one of the preset positions). The control portion 310 transmits the command signal CM, which is generated based on the operation signal US, to the terminal control portion 210 of the camera terminal device 200 via the network interface portion 206. The terminal control portion 210 analyzes the command signal CM, and generates the direction control signal CTc using the information of the preset position stored in the panorama image storage portion 207. Thus, the imaging direction of the camera portion 201 is adjusted, by the imaging direction control portion 204 and the imaging direction adjustment portion 205, to a direction instructed by the direction control signal CTc.

Note that, when the information of the preset position is stored in the memory provided in the center server 300, the information is included in the command signal CM and is transmitted to the camera terminal device 200. Then, the terminal control portion 210 analyzes the command signal CM, and generates the direction control signal CTc using the information of the preset position transmitted from the center server 300.

Figure 24:
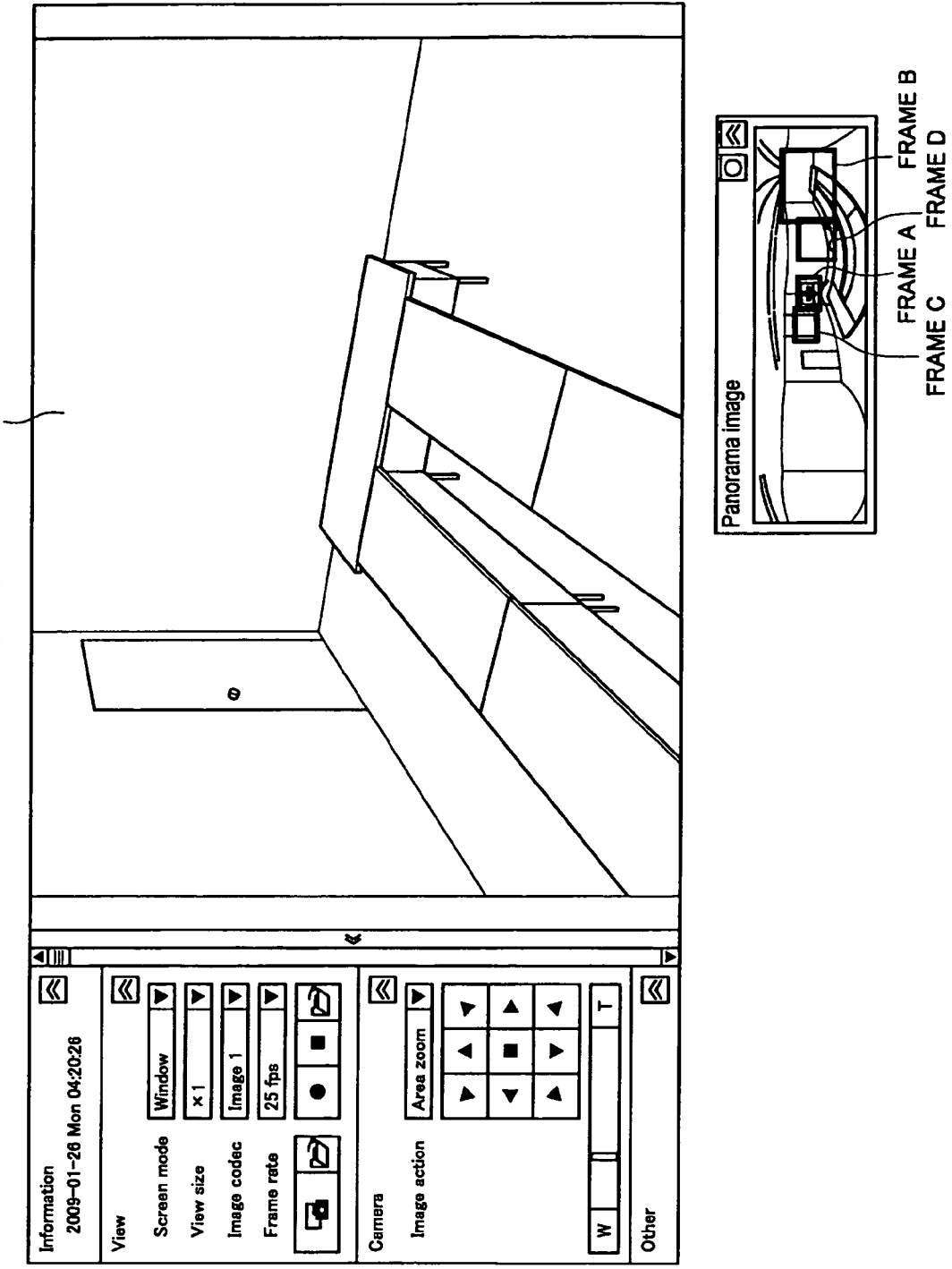
FIG. 24 is a schematic diagram showing a method for changing the preset position.
Figure 25:
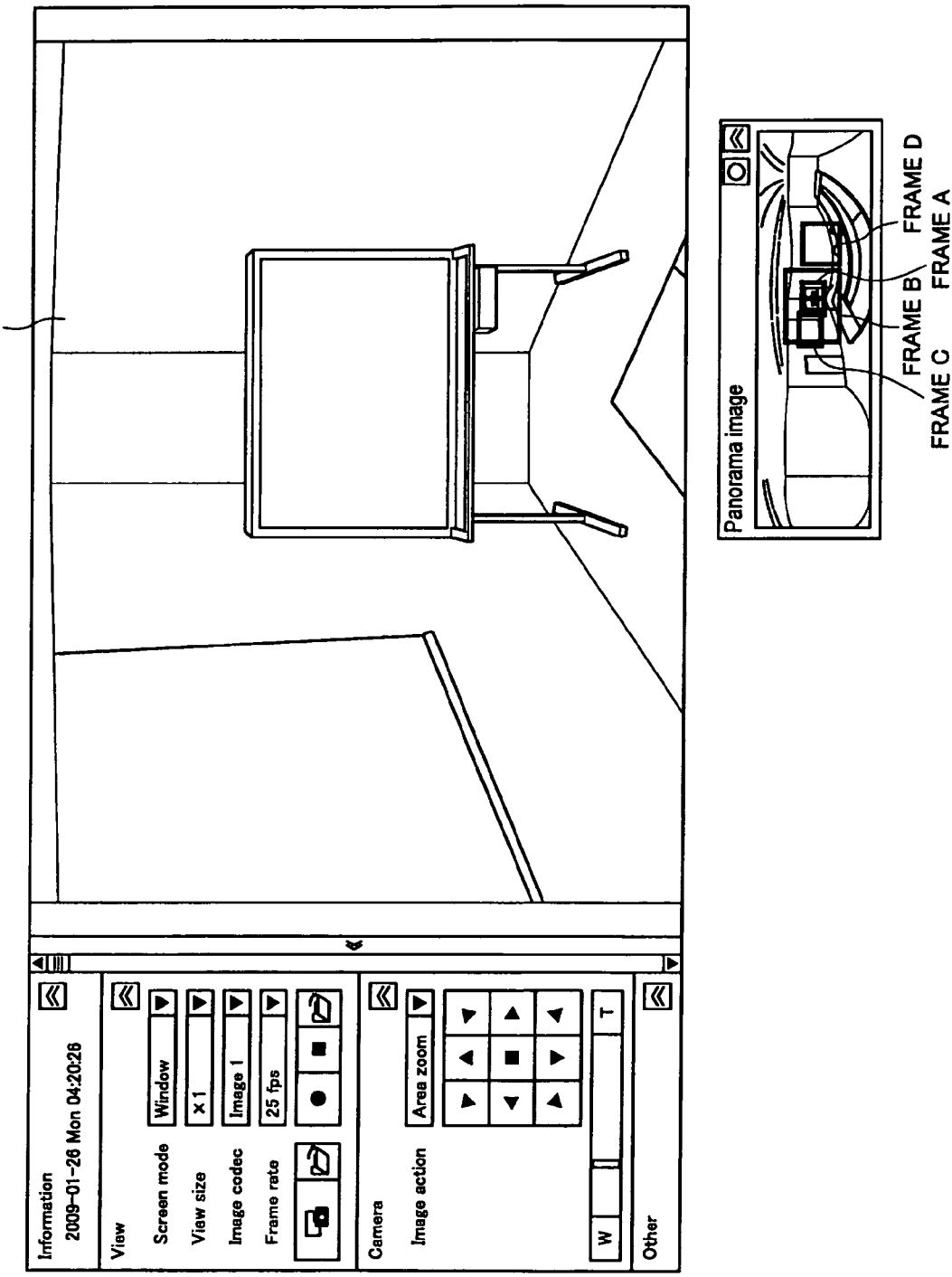
FIG. 25 is a schematic diagram showing the method for changing the preset position.

FIG. 24 and FIG. 25 are schematic diagrams showing a method for changing the preset position. Specifically, FIG. 24 and FIG. 25 show a method for changing the preset position by moving the position of the frame B in the panorama image. More specifically, if the user drags the frame B in the state shown in FIG. 24 and ends the drag operation when the frame B is moved to a position shown in FIG. 25, the user can change the preset position that corresponds to the frame B to the position shown in FIG. 25. In the state shown in FIG. 25, as a result of the drag operation performed by the user, the position of the frame B is moved to a position that corresponds to the "whiteboard" and the "projection screen", and a live image of the "whiteboard" and the "projection screen" that corresponds to the moved frame B is displayed. Thus, the preset position corresponding to the frame B is set to the position that corresponds to the "whiteboard" and the "projection screen".

In this case, when the user drags the frame B to move it, the operation signal US in accordance with the user operation is transmitted from the user interface portion 315 to the control portion 310. The operation signal US includes information of the frame B (the preset position corresponding to the frame B) moved by the drag operation. The control portion 310 transmits the command signal CM, which is generated based on the operation signal US, to the terminal control portion 210 of the camera terminal device 200 via the network interface portion 206. The terminal control portion 210 analyzes the command signal CM, and changes the information of the preset position stored in the panorama image storage portion 207. At the same time, the terminal control portion 210 generates the direction control signal CTc based on the changed preset position. Thus, the changed preset position is stored in the panorama image storage portion 207, and the imaging direction of the camera portion 201 is adjusted to a direction instructed by the direction control signal CTc.

Note that, when the information of the preset position is stored in the memory provided in the center server 300, the control portion 310 changes the preset position stored in the memory, based on the command signal CM generated based on the operation signal US. Then, the control portion 310 transmits the command signal CM that includes the changed preset position to the terminal control portion 210 of the camera terminal device 200 via the network interface portion 206. The terminal control portion 210 analyzes the command signal CM, and generates the direction control signal CTc based on the changed preset position. Thus, the imaging direction of the camera portion 201 is adjusted to the direction instructed by the direction control signal CTc.

In this manner, by dragging and moving each of the frames displayed in the panorama image, it is possible to freely change the preset position. In this case, all the ranges that can be captured by the camera terminal device 200 are displayed on the panorama image. Therefore, the user can visually set a desired one of the preset positions from among all the ranges that can be captured by the camera terminal device 200.

Figure 26:
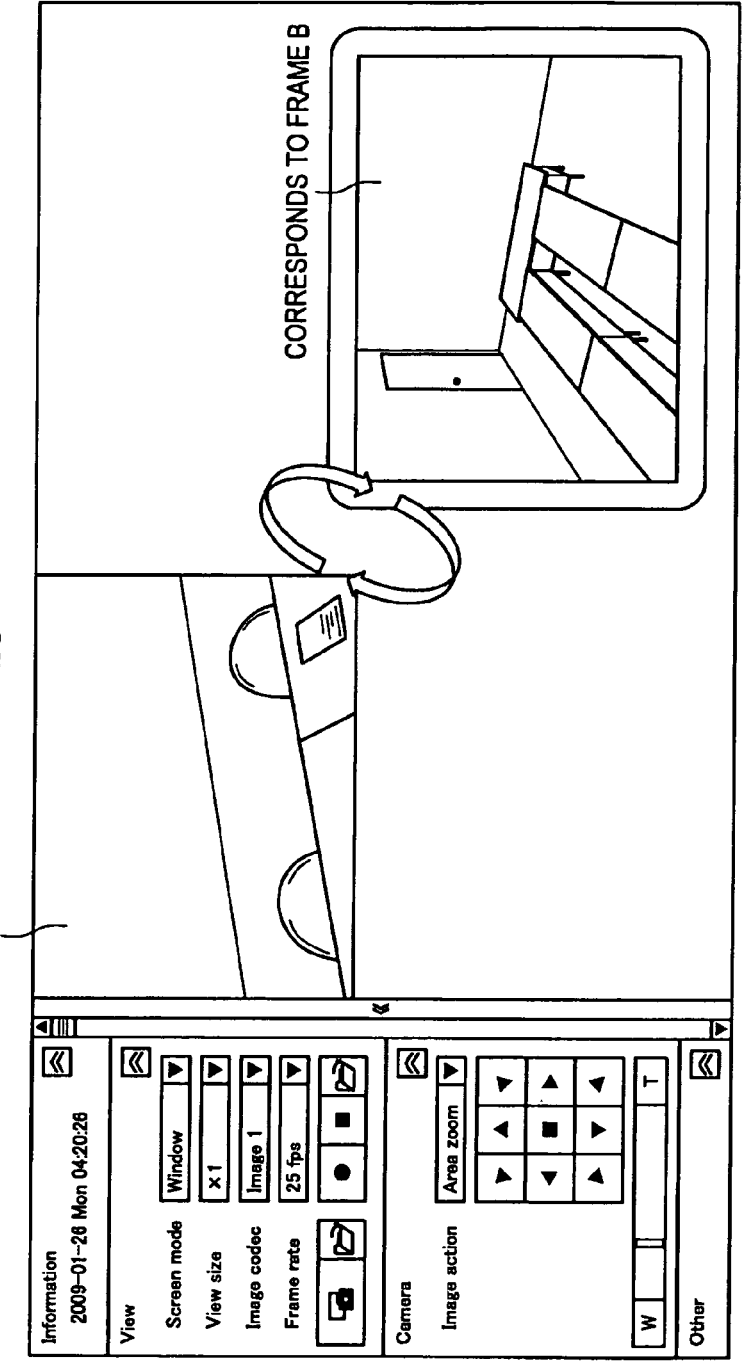
FIG. 26 is a schematic diagram showing a state in which two frames, namely, the frame B and the frame D are selected by a drag operation performed by a user.

Next, an example will be explained in which a plurality of live images that are set in the panorama image are displayed. FIG. 26 shows a state in which two frames, namely, the frame B and the frame D are selected by a drag operation performed by the user. In this case, the image of the "relatively wide range of the conference room" that corresponds to the frame B and the image of the "relatively narrow range of the conference room" that corresponds to the frame D are alternately displayed as live images at predetermined time intervals.

Figure 27:
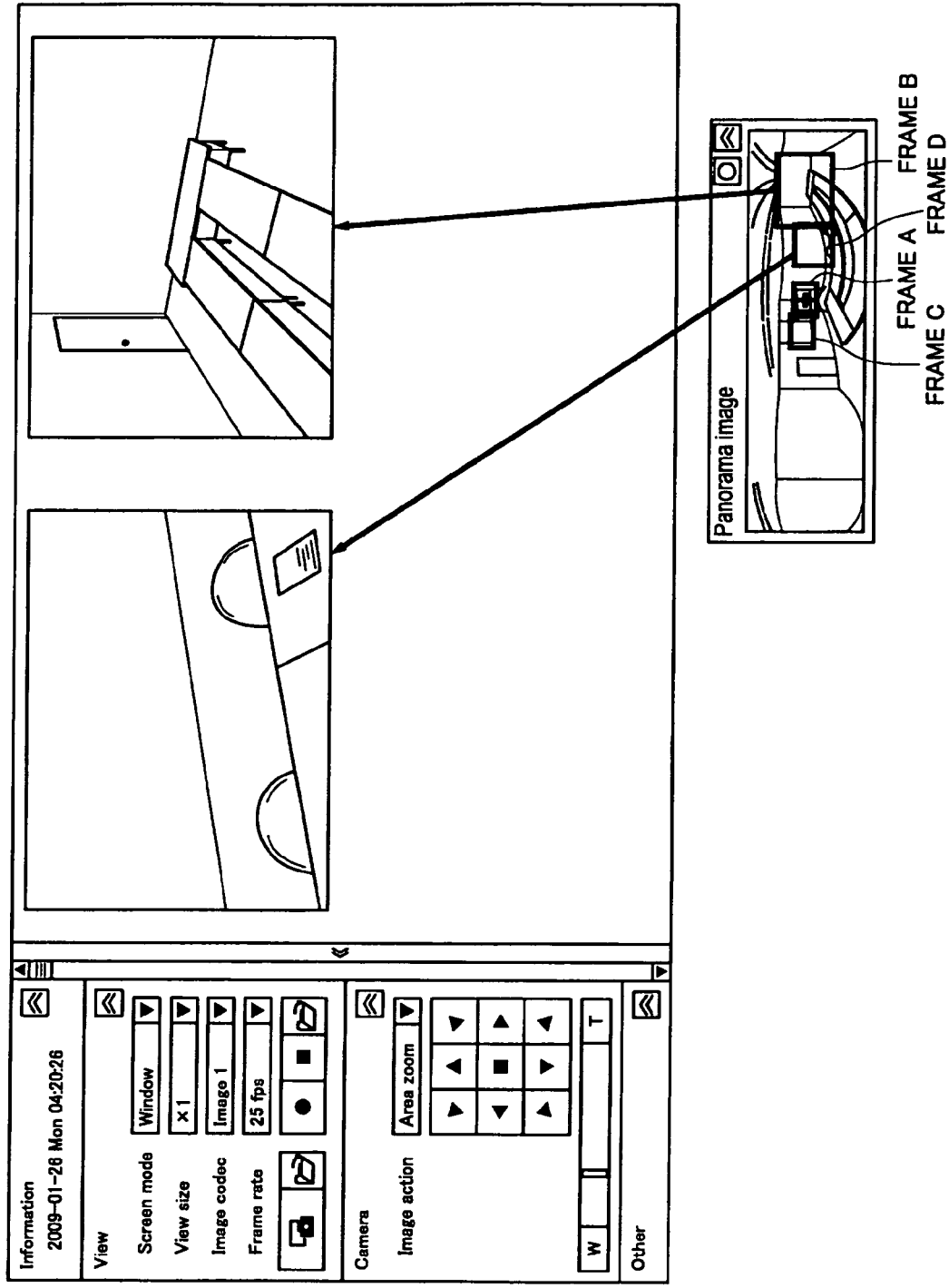
FIG. 27 is a schematic diagram showing an example in which an image corresponding to the frame B and an image corresponding to the frame D are both displayed when the two frames (the frame B and the frame D) are selected by the drag operation performed by the user.

FIG. 27 shows a case in which, when the two frames, namely, the frame B and the frame D are selected by a drag operation performed by the user, the image of the "relatively wide range of the conference room" that corresponds to the frame B and the image of the "relatively narrow range of the conference room" that corresponds to the frame D are both displayed. In this case, since two live images cannot be displayed simultaneously, the two images are alternately updated to latest live images. Alternatively, one of the two images may be displayed as a live image, and a past image of the other image acquired before then may be displayed.

In the cases of FIG. 26 and FIG. 27, when the user specifies both the frame B and the frame D by a drag operation, the operation signal US in accordance with the drag operation is transmitted from the user interface portion 315 to the control portion 310. The operation signal US includes information of the selected frames B and D. The control portion 310 transmits the command signal CM, which is generated based on the operation signal US, to the terminal control portion 210 of the camera terminal device 200 via the network interface portion 206. The terminal control portion 210 analyzes the command signal CM, and generates the direction control signal CTc based on information indicating that the two frames B and D are selected and on information of the preset positions of the frames B and D that is stored in the panorama image storage portion 207. Thus, the imaging direction of the camera portion 201 is adjusted, by the imaging direction control portion 204 and the imaging direction adjustment portion 205, to a direction instructed by the direction control signal CTc.

Figure 28:
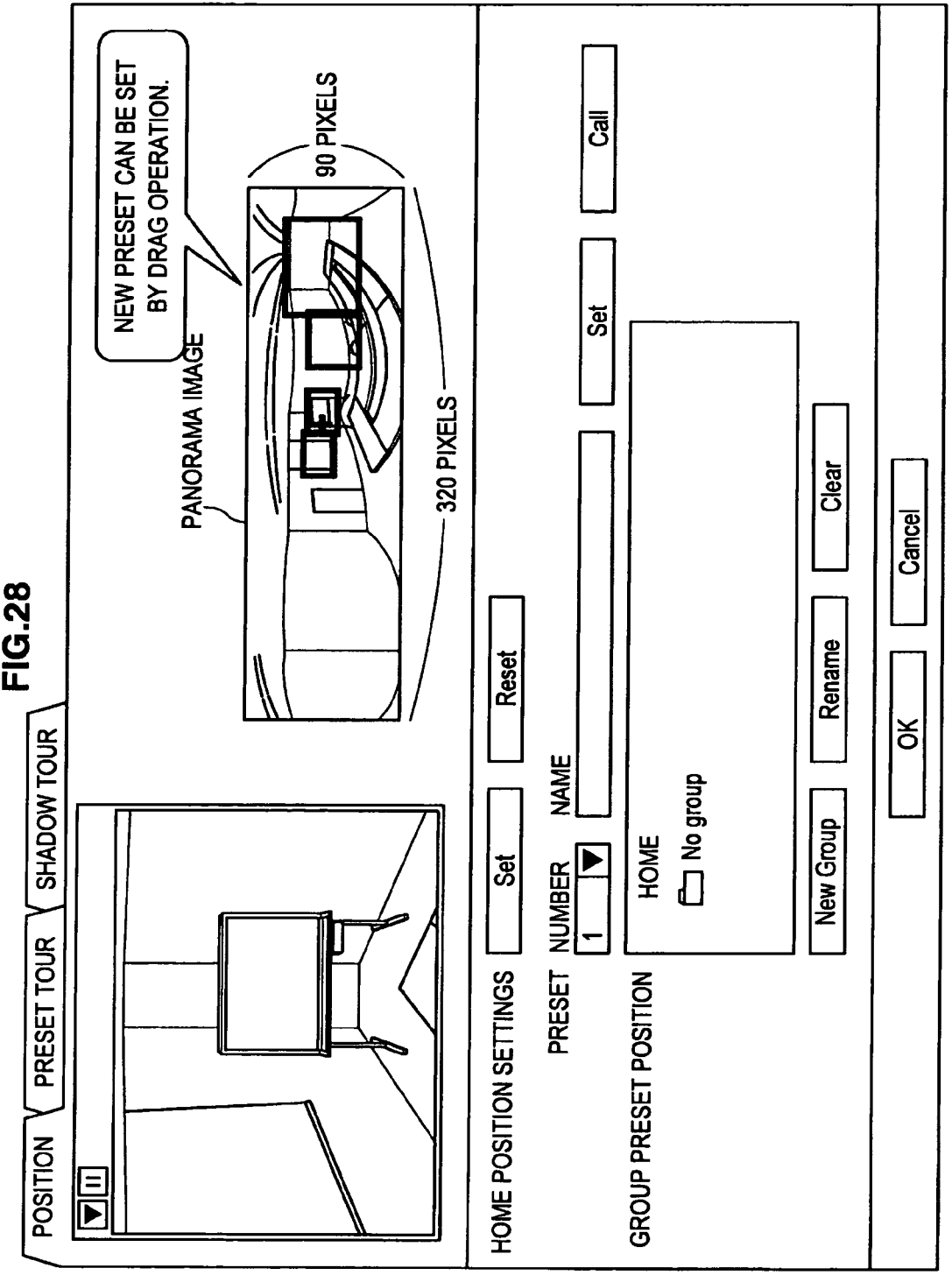
FIG. 28 is a schematic diagram showing, in detail, an example of a setting screen to set the preset position.

FIG. 28 is a schematic diagram showing, in detail, an example of a setting screen to set the preset position. The preset screen shown in FIG. 28 appears when a "preset position" button shown in FIG. 10 is clicked. In the example of the setting screen shown in FIG. 28, the panorama image is displayed to the right of the center of the screen, and an image (a live image) of the preset position is displayed to the left of the center of the screen.

The user can perform a default setting of the preset positions by performing a drag operation in the panorama image. In this case, for example, the default setting of each of the frames A to D is performed by dragging, as a start point and an end point, both ends of a diagonal line of the rectangular frame on the panorama image. As a result, the frames A to D that have been set by default are displayed on the panorama image. After that, in a state where the user has set the frames A to D at desired positions by performing drag operations using the method shown in FIG. 24 and FIG. 25, when the user sets a preset number and a name for each of the preset positions and clicks a "Set" button, the preset corresponding to each of the frames A to D is completed. Further, the preset can be called by clicking a "Call" button. Note that, the settings can be made by inputting coordinates of the preset positions. In the present embodiment, four preset positions are shown as an example. However, the number of the preset positions is not particularly limited.

In specifying a "Group preset position" shown in FIG. 28, the preset positions can be classified into some groups. The groups are expressed as a tree structure. In a "Home setting position" menu, the camera home position is displayed.

When a new group folder is created, an attribute of the new group folder is shown in a "New Group" column. A "Rename" button is a button that is clicked when a group name is changed. A "Clear" button is a button that is clicked when a group is deleted. An "OK" button is a button that is clicked when the settings of this page are stored in the camera. A "Cancel" button is a button that is clicked when a setting change of this page is cancelled.

When the user sets the preset position, the operation signal US in accordance with the user operation is transmitted from the user interface portion 315 to the control portion 310. The control portion 310 transmits the command signal CM, which is generated based on the operation signal US, to the terminal control portion 210 of the camera terminal device 200 via the network interface portion 206. The terminal control portion 210 analyzes the command signal CM, and stores the preset position included in the command signal CM in the panorama image storage portion 207. Further, when information of the preset position is stored in the memory provided in the center server 300, the control portion 310 stores the preset position in the memory based on the command signal CM that is generated based on the operation signal US.

As described above, the user can set, change and delete the preset position(s) using a pointing device, such as a mouse, a keyboard or the like, in a state where the screen shown in FIG. 28 is displayed on the monitor 320 connected to the center server 300 or on a display portion of the client 400.

Next, setting, on the panorama image, of the position and size of a frame indicating the preset position will be explained. When the user specifies the position and size of the frame in the panorama image using a drag operation or the like, the center position of the frame is set as the preset position. Then, the center position of the frame is stored as the preset position in the panorama image storage portion 207 or the memory of the center server 300.

A reference size of the frame is set to a size of the frame that is positioned in the center of the panorama image, because image curvature occurs at the periphery of the panorama image. Then, the reference frame is enlarged or reduced to have a size corresponding to an imaging magnification, and a final size of the frame is determined.

A relationship between the frame size and a zoom amount of the camera portion 201 of the camera terminal device 200 is set in the following manner, for example. As shown in FIG. 28, it is assumed that the size of the panorama image is 90 pixels in height and 320 pixels in width. In the example shown in FIG. 28, the panorama image is an image (the second panorama image) captured by a 360-degree pan operation. Therefore, the angle of view in the horizontal direction corresponds to 360 degrees.

As an example, it is assumed that a horizontal angle of view of a lens of the camera portion 201 is 58 degrees (wide end) and 2 degrees (tele end), and the maximum resolution of the camera portion 210 is 640×480 (pixels). In this case, the size (Xw, Yx) (where the unit of Xw and Yw is a pixel (the number of pixels)) of the rectangle when the lens of the camera portion 201 is set at the wide end is expressed by the following relationship.

$$360 \text{ (degrees)}: 58 \text{ (degrees)} = 320: Xw$$

Accordingly, the size of the rectangle in the horizontal direction is Xw=52 (pixels).

The size Yw of the rectangle in the vertical direction is expressed by the following relationship.

$$640: 480 = 52: Yw$$

Accordingly, the equation Yx=39 (pixels) is obtained. Therefore, the size of the rectangular frame when the lens of the camera portion 201 is set at the wide end is (52, 39) pixels.

When the camera terminal device 200 is mostly zoomed and the lens is at the tele end, the size of the rectangle (Xt, Yt) (pixels) is expressed by the following relationship.

$$360 \text{ (degrees)}: 2 \text{ (degrees)} = 320: Xw$$

Accordingly, the size of the rectangle in the horizontal direction is Xw=1.8 (pixels).

Further, the size Yw of the rectangular frame in the vertical direction is expressed by the following relationship.

$$640: 480 = 1.7: Yw$$

Accordingly, the equation Yw =1.4 (pixels) is obtained.

Accordingly, as described above, the relationship between the size of the frame and the zoom amount of the camera portion 201 is obtained. The control portion 310 generates the command signal CM based on the position of the frame specified by the user and on the zoom amount, and transmits the command signal CM to the terminal control portion 210 of the camera terminal device 200 via the network interface portion 206. The terminal control portion 210 analyzes the command signal CM, and calculates the size of the frame in the preset position based on the zoom amount included in the command signal CM. Then, the terminal control portion 210 stores the calculated size of the frame in the panorama image storage portion 207 together with the center position of the preset position. When the preset position is stored in the memory of the center server 300 or the client 400, the control portion 310 sets the size of the frame based on a zoom position that is included in the command signal CM. Further, based on the center position of the frame that is included in the command signal CM, the control portion 310 stores the preset position in the memory. Note that, instead of specifying the zoom amount based on the size of the frame, the zoom amount may be specified by keyboard input or the like.

As described above, according to the present embodiment, the preset positions are displayed on the whole image (the panorama image), and it is therefore possible to easily ascertain the preset positions in the whole image. Further, since the preset can be specified by specifying it on the whole image, it is possible to significantly improve usability. Further, since the size of the preset position (the size of the frame) can be displayed based on an imaging angle of view, it is also possible to ascertain a relative size of the angle of view that has been preset. Furthermore, even in a case where the whole image and an actually captured image correspond to each other in a distorted manner, the size of the angle of view can be ascertained relatively.

Note that, in the above-described explanation, a case is explained in which a plurality of users control the imaging direction of each of the camera terminal devices 200. However, the present invention can also be applied to a system (a system that performs pan/tilt control digitally) in which the imaging direction of each of the camera terminal devices 200 is fixed, and only a region corresponding to a command from a user is cut out from the whole image and displayed. This system is achieved such that, for example, the control portion 310 of the center server 300 specifies a cut out range from the whole image in accordance with an operation input of the imaging direction by the user, and performs display control using the display processing portion 305. Also in this case, by performing the above-described control using the preset positions, it is possible to digitally control an imaging range of a live image. As described above, the system of the present embodiment can be applied not only to the system that mechanically controls the imaging direction, but also to the system that digitally controls the imaging direction.

The exemplary embodiment of the present invention is described above in detail with reference to the appended drawings. However, the present invention is not limited to the above-described examples. It should be understood by those skilled in the art that various modifications, combinations, sub-combinations and alterations may occur depending on design requirements and other factors insofar as they are within the scope of the appended claims or the equivalents thereof.

What is claimed is:

1. A control device comprising:
   a display control portion configured to perform control such that a whole image display region, in which a whole image captured by a camera is displayed, and an enlarged image display region, in which a region corresponding to a position specified on the whole image is enlarged and an enlarged image is displayed, are displayed; and
   a control portion configured to perform control such that the region corresponding to the position specified on the whole image is changed,
   the region includes at least one preset region, and the display control portion is configured to display, on the whole image, a frame that corresponds to the preset region which is registered in advance by specifying a position of the frame on the whole image,
   each said preset region represents a respective selectable region such that when a desired preset region is selected a live image of the respective preset region is enlarged based on a size of the respective preset region and is displayed simultaneously with the whole image,
   when a respective preset region is not positioned in a center of the whole image, the display control portion is configured to correct for image curvature of the whole image by determining a corrected size of the respective frame to be displayed by enlarging or reducing a size of a reference frame by use of an imaging magnification being applied, the size of the reference frame being set to a size of the respective preset region if positioned in the center of the whole image.

2. The control device according to claim 1, wherein, when the frame that corresponds to the preset region is selected on the whole image, the control portion is configured to control movement of the camera to move an imaging direction of the camera such that the selected preset region is captured.

3. The control device according to claim 1,
   wherein the control portion is configured to perform control such that the region corresponding to the position specified on the whole image is captured by the camera.

4. The control device according to claim 3,
   wherein the display control portion is configured to use a size of an angle of view that is set based on the preset region in determining the corrected size of the respective frame.

5. The control device according to claim 3,
   wherein the display control portion is configured to change a position of the preset region in accordance with a drag operation performed by a user.

6. The control device according to claim 3,
   wherein, when a second plurality of the preset regions are specified on the whole image, the control portion is configured to control an imaging direction of the camera such that the second plurality of the preset regions are sequentially captured, and wherein the display control portion is configured to control image display such that the second plurality of the preset regions are displayed as a list.

7. The control device according to claim 6,
   wherein, when the second plurality of the preset regions are specified on the whole image, the control portion is configured to control the imaging direction of the camera such that the second plurality of the preset regions are sequentially captured, and
   wherein the display control portion is configured to alternately display the second plurality of the preset regions.

8. A camera system comprising:
   a camera configured to capture an image; and
   a control device configured to control the camera and for use as a monitoring system,
   wherein the control device includes
   a display control portion configured to perform control such that a whole image display region, in which a whole image captured by the camera is displayed, and an enlarged image display region, in which a region corresponding to a position specified on the whole image is enlarged and an enlarged image is displayed, are displayed, and
   a control portion configured to perform control such that the region corresponding to the position specified on the whole image is changed,
   wherein the region includes at least one preset region, and the display control portion is configured to display, on the whole image, a frame that corresponds to the preset region which is registered in advance by specifying a position of the frame on the whole image, and
   wherein each said preset region represents a respective selectable region such that when a desired preset region is selected a live image of the respective preset region is enlarged based on a size of the respective preset region and is displayed simultaneously with the whole image,
   when a respective preset region is not positioned in a center of the whole image, the display control portion is configured to correct for image curvature of the whole image by determining a corrected size of the respective frame to be displayed by enlarging or reducing a size of a reference frame by use of an imaging magnification being applied, the size of the reference frame being set to a size of the respective preset region if positioned in the center of the whole image.

9. The camera system according to claim 8,
   wherein the control portion is configured to perform control such that the region corresponding to the position specified on the whole image is captured by the camera.

10. The camera system according to claim 9,
    wherein, when the frame that corresponds to the preset region is selected on the whole image, the control portion is configured to control an imaging direction of the camera such that the selected preset region is captured.

11. The camera system according to claim 9,
    wherein the display control portion is configured to use a size of an angle of view that is set based on the preset region in determining the corrected size of the respective frame.

12. The camera system according to claim 9,
wherein the display control portion is configured to change a position of the preset region in accordance with a drag operation performed by a user.

13. The camera system according to claim 9,
wherein, when a second plurality of the preset regions are specified on the whole image, the control portion is configured to control an imaging direction of the camera such that the second plurality of the preset regions are sequentially captured, and
wherein the display control portion is configured to control image display such that the second plurality of the preset regions are displayed as a list.

14. The camera system according to claim 13,
wherein, when the second plurality of the preset regions are specified on the whole image, the control portion is configured to control the imaging direction of the camera such that the second plurality of the preset regions are sequentially captured, and
wherein the display control portion is configured to alternately display the second plurality of the preset regions.

15. A non-transitory computer readable memory having stored therein a program that comprises instructions that when executed command a computer to function as:
a display control unit which performs control such that a whole image display region, in which a whole image captured by a camera is displayed, and an enlarged image display region, in which at least one preset region specified on the whole image is enlarged and an enlarged image is displayed, are displayed, and which displays, on the whole image, a frame that corresponds to the preset region which is registered in advance by specifying a position of the frame on the whole image; and
a control unit that performs control such that a region corresponding to a position specified on the whole image is changed,
wherein each said preset region represents a respective selectable region such that when a desired preset region is selected a live image of the respective preset region is enlarged based on a size of the respective preset region and is displayed simultaneously with the whole image,
when a respective preset region is not positioned in a center of the whole image, the display control portion is configured to correct for image curvature of the whole image by determining a corrected size of the respective frame to be displayed by enlarging or reducing a size of a reference frame by use of an imaging magnification being applied, the size of the reference frame being set to a size of the respective preset region if positioned in the center of the whole image.

16. A control method comprising:
performing display control such that a whole image display region, in which a whole image captured by a camera is displayed, and an enlarged image display region, in which a region corresponding to a position specified on the whole image is enlarged and an enlarged image is displayed, are displayed; and
performing control such that the region corresponding to the position specified on the whole image is changed,
the region includes at least one preset region, and the performing display control includes displaying, on the whole image, a frame that corresponds to the preset region which is registered in advance by specifying a position of the frame on the whole image, and
each said preset region represents a respective selectable region such that when a desired preset region is selected a live image of the respective preset region is enlarged based on a size of the respective preset region and is displayed simultaneously with the whole image, when a respective preset region is not positioned in a center of the whole image, the performing display control includes correcting for image curvature of the whole image by determining a corrected size of the respective frame to be displayed by enlarging or reducing a size of a reference frame by use of an imaging magnification being applied, the size of the reference frame being set to a size of the respective preset region if positioned in the center of the whole image.

\* \* \* \* \*